US006955079B2

(12) United States Patent
Ishihara et al.

(10) Patent No.: US 6,955,079 B2
(45) Date of Patent: Oct. 18, 2005

(54) FOREIGN MATERIAL DETECTOR FOR SLIDING DOOR AND DETECTING METHOD THEREOF

(75) Inventors: Hidenori Ishihara, Hamamatsu (JP); Hirokazu Tsuda, Toyohashi (JP); Kenji Kato, Kariya (JP); Kazuo Nimura, Okazaki (JP)

(73) Assignees: Asmo Co., Ltd. (JP); Toyota Shatai Kabushiki Kaisha (JP)

( * ) Notice: Subject to any disclaimer, the term of this patent is extended or adjusted under 35 U.S.C. 154(b) by 187 days.

(21) Appl. No.: 10/067,531

(22) Filed: Feb. 7, 2002

(65) Prior Publication Data

US 2002/0104373 A1 Aug. 8, 2002

(30) Foreign Application Priority Data

Feb. 7, 2001 (JP) ...................................... 2001-031430

(51) Int. Cl.[7] .......................... G01M 19/00; H02P 7/00
(52) U.S. Cl. ...................................... 73/118.1; 318/445
(58) Field of Search ................................ 73/118.1, 753; 318/445, 446, 466; 296/155; 340/552; 200/61.41; 307/10.1; 49/28

(56) References Cited

U.S. PATENT DOCUMENTS 4,970,446 A * 11/1990 Yaguchi ..................... 318/280
5,192,837 A * 3/1993 Chardon .................. 200/61.41
5,906,071 A * 5/1999 Buchanan, Jr. .............. 49/360
5,932,931 A * 8/1999 Tanaka et al. ............. 307/10.1
5,982,126 A * 11/1999 Hellinga et al. ............ 318/468
6,081,088 A * 6/2000 Ishihara et al. ............. 318/466
6,163,080 A * 12/2000 Castellon ................... 307/10.1
6,308,461 B1 * 10/2001 Hopson et al. ................ 49/28
6,339,305 B1 * 1/2002 Ishihara et al. ............. 318/445

FOREIGN PATENT DOCUMENTS

| | | |
|---|---|---|
| JP | 10-266701 | 10/1998 |
| JP | 11-182136 | 7/1999 |
| JP | 11-222036 | 8/1999 |
| JP | 2000-292279 | 10/2000 |

* cited by examiner

*Primary Examiner*—Edward Lefkowitz
*Assistant Examiner*—Octavia Davis
(74) *Attorney, Agent, or Firm*—Parkhurst & Wendel, L.L.P.

(57) ABSTRACT

In a foreign material detector for a sliding door, a pressure sensor is disposed being offset toward a vehicle interior side and a substantial vehicle front side of a hem and being offset toward a substantial vehicle exterior side with respect to a position supported by a bracket as well, in order for the foreign material to be detected, even though a direction of a reaction force effected from a foreign material is tilted and intersected with respect to a moving direction of the sliding door.

25 Claims, 14 Drawing Sheets

FOREIGN MATERIAL DETECTOR FOR SLIDING DOOR AND DETECTING METHOD THEREOF

BACKGROUND OF THE INVENTION

1. Field of the Invention

The present invention relates to a detector for detecting a movable body such as an automatic door catching a foreign material, to a foreign material detector for a sliding door which detects a foreign material caught between a door panel and a vehicle body of a vehicle and a detecting method thereof.

2. Description of the Related Art

Among vehicles referred to as recreation vehicles and generally including wagons and vans, there is a vehicle in which a so-called automatic sliding door device, which allows a door panel to slide forward and backward along a side wall portion of a vehicle body by means of a driving force of a motor and opens and closes an entrance formed in the side wall of the vehicle body, is adopted. In this device, by operating an operation switch provided in the vicinity of a driver's seat and at a predetermined location of back seats, the motor is driven and the door panel is moved.

Further, among this kind of automatic sliding door devices, there is an automatic sliding door device which includes a foreign material detector which detects a state of catching a foreign material existing between a door panel and a vehicle body at the time of closing movement of the door panel.

The foreign material detector applied to the above-described automatic sliding door device includes a pressure sensor which is elongated along a front end portion (i.e., an end portion of a closing movement direction side) of a door panel and in which a plurality of wires are disposed inside a hollow outer cover portion thereof along a longitudinal direction of the pressure sensor. This pressure sensor is structured such that, when the outer cover portion receives a pressing force and is elastically deformed, the wires disposed within the outer cover portion are bent and come into contact with each other, accompanied with the elastic deformation of the outer cover portion. Then, by detecting a change in an electric resistance at the time that the wires came into contact with each other, for example, a fact that the pressing force acted upon the outer cover portion, i.e., a fact that a foreign material abutted the front end portion of the door panel which moves in a closing direction, is detected.

Meanwhile, among vehicles to which the above-described sliding doors are applied, there is a vehicle, in which a so-called "vent hem structure" in which a front end portion of a door panel is formed in a plate form which is sufficiently thinner than a main body portion of the door panel, is adopted. In this structure, when the door panel closes an entrance, the front end portion of this door panel is located at a vehicle interior side of a vehicle body (a side wall of the vehicle), and also opposes the vehicle body along a substantial right and left direction of the vehicle (a substantial vehicle transverse direction).

In a case in which the vent hem structure is adopted in a vehicle, the front end portion of the door panel opposes the vehicle body at a vehicle interior side in a closed state of the door panel. Thus, if a coating which is similar to that coated on the vehicle body is applied up to a tip end of the door panel, even in a case in which a gap is formed between the entrance and the door panel, the coating applied to the front end portion of the door panel can be seen in an inner side thereof. This feature contributes to improve an appearance quality of a vehicle.

In a vehicle in which such a vent hem structure is adopted, the front end portion of the door panel faces the vehicle body at the vehicle interior side in the closed state of the door panel, and the door panel moves toward a vehicle front and then shifts toward a vehicle interior side immediately before the door panel closes up the entrance. This feature is different from that of a structure, in which a door panel simply moves in a substantial longitudinal direction of a vehicle.

Therefore, concerning the above-described foreign material detector, improvement in a detection performance has been longed with respect to catching a foreign material accommodating with the above-described vent hem structure.

SUMMARY OF THE INVENTION

An object of the present invention is to provide a foreign material detector and a foreign material detector for a sliding door, each of which can reliably detect catching of a foreign material occurred between a movable body and a closed body in a structure in which an end portion of a closing movement direction side of the movable body is positioned at a lateral side of the closed body in a state in which the movable body such as a door panel closes the closed body such as a vehicle body in which an entrance is formed.

A first aspect of the present invention is a foreign material detector for detecting a foreign material caught between a closing movement side end portion of a movable body and a closed body, which is applied to an opening and closing mechanism in which the movable body moves in the closing movement direction with respect to the closed body, the movable body moves toward a closing direction which is leaned with respect to the closing movement direction immediately before the closing movement direction side end portion of the movable body reaches a closing movement end point located substantially at an orthogonal direction lateral side of the closed body with respect to the closing movement direction, and the movable body thus closes a gate provided between the movable body and the closed body along the closing movement direction, comprising: a pressure sensor, which is directly or indirectly mounted to the movable body at lateral side of the movable body along a substantial orthogonal direction with respect to the closing movement direction, moves with the movable body, and detects a pressed reaction force effected from the foreign material when it presses the foreign material.

In an opening and closing mechanism with the above-described structure in which the foreign material detector is adopted, a movable body moves in a closing direction which is leaned with respect to the closing movement direction at a point immediately before an end point of the closing movement of the movable body, a gate between the movable body and a closed body is thereby closed by the movable body.

Therefore, in a case in which a foreign material was caught between the movable body and the closed body in this opening and closing mechanism, an orientation of a pressing force applied from the movable body to the foreign material and that of a pressed reaction force effected from the foreign material corresponding to the pressing force are tilted with respect to the closing movement direction.

Moreover, in a state in which the movable body reached at the end point of the closing movement thereof, a closing movement direction side end portion of the movable body is positioned substantially at an orthogonal direction lateral side with respect to the closing movement direction of the closed body. Therefore, when the foreign material is caught between the movable body and the closed body, the pressing force applied from the movable body and along the closing direction acts not only toward a direction in which the foreign material is compressed but toward a direction in which the foreign material is sheared.

Here, in the present foreign material detector, though the pressure sensor is integrally provided with the movable boy, a mounting position of the pressure sensor with respect to the movable body is at a substantial orthogonal direction lateral side with respect to the closing movement direction of the movable body so that the pressed reaction force effected from the foreign material which is in a caught state is reliably detected by the pressure sensor, in comparison to a case in which the pressure sensor is simply provided at a closing movement direction side end portion of the movable body. Therefore, the state of catching the foreign material can reliably be detected even in the opening and closing mechanism as described above.

It should be noted that an aspect of the gate is not limited at all in the present invention. In other words, the gate may simply be a gap between the movable body and the closed body, or may substantially be an opening formed in the closed body.

It should further be noted that a movement of the closed body is not limited at all in the present invention. In other words, a structure in which the closed body moves as well as the movable body, when the movable body opens/closes the gate, may also be applied.

Preferably, the present invention is characterized by the pressure sensor comprising: an outer cover portion which is hollow and formed of a synthetic resin which is elastically deformable by the pressed reaction force; a plurality of wires which is provided in an inner side of the outer cover portion and come into contact to connect to each other due to the elastic deformation of the outer cover portion; and a retaining portion which has a rigidity higher than the outer cover portion and retains the outer cover portion at a side opposite to the closing movement direction or the closing direction of the outer cover portion.

In the foreign material detector with the above-described structure, when the hollow outer cover portion forming the pressure sensor is elastically deformed by the pressed reaction force effected from the foreign material, the plurality of wires provided within the outer cover portion come into contact to connect to each other due to the elastic deformation of the outer cover portion. The state of catching the foreign material can be detected by detecting this electrical conduction.

Here, though the outer cover portion is retained by the retaining portion from the direction opposite to the closing movement or the closing direction of the movable body, the pressure sensor retained by the retaining portion is positioned at a closing movement direction side or the closing direction side of the closing movement direction side end portion of the movable body. Therefore, the foreign material does not abut the closing movement direction side end portion of the movable body before it elastically deforms the outer cover portion, the foreign material can thus be reliably detected.

More preferably, the present invention is characterized in that the pressure sensor is mounted to the movable body in a state in which a gap is formed between the pressure sensor and the closing movement direction side end portion of the movable body.

In the foreign material detector with the above-described structure, since a gap is formed between the pressure sensor and the closing movement direction side end portion of the movable body, the elastic deformation of the outer cover portion due to the pressed reaction force effected from the foreign material is not prevented by an interference of the closing movement direction side end portion of the movable body. Therefore, it is ensured that the outer cover portion is elastically deformed and electrodes of the wires provided within the outer cover portion thus come into contact to connect to each other. Thus, reliability of the present foreign material detector increases.

Preferably, the present invention is characterized by comprising: a supporting device which is integrally mounted to the movable body at a side opposite to the closing movement direction side of the pressure sensor; and a retainer in which a groove portion into which the supporting device can enter from the side opposite to the closing movement direction and which includes a nipping portion which nips a tip end portion of the supporting device which entered the groove portion from both sides thereof, while retaining the pressure sensor.

In the foreign material detector with the above-described structure, the supporting device enters the groove portion formed in the retainer which retains the pressure sensor, the tip end portion of the supporting device is nipped from both sides thereof by the nipping portion of the retainer, and this supporting device is further integrally mounted to the movable body, the pressure sensor is thereby indirectly mounted to the movable body and supported.

Here, as described above, the tip end portion of the supporting device entered into the groove portion is nipped from both sides thereof by the nipping portion. Therefore, the nipping portion interferes with the tip end portion of the supporting device and thereby regulates displacement of the supporting device.

The relative displacement between the supporting device and the retainer due to the above-described external forces can thereby be prevented and the pressure sensor can always be retained at a preset position, so that a constant detection performance can be continually maintained. Moreover, there is a sufficient possibility that the above-described external forces arises at the time of mounting the pressure-sensor and at the time of joining the retainer to the supporting device. However, since a change in a position of the pressure sensor caused by such external forces is prevented, the external forces can sufficiently be applied to the pressure sensor and the retainer, reliable mounting can be carried out, while the mounting can be carried out with no concern about the external force, which improves workability.

A second aspect of the present invention is a foreign material detector for a sliding door which is applied to a sliding door device, in which a door panel performs an opening and closing movement in a vehicle longitudinal direction, the door panel moves toward a closing direction which is leaned with respect to the vehicle longitudinal direction immediately before a closing movement direction side end portion of the door panel reaches a closing movement end point located at a lateral side of a vehicle side wall along a substantial orthogonal direction with respect to a closing movement direction, a gate provided in the vehicle side wall is thereby closed, comprising: a pressure sensor, which is provided at a position offsetting toward a closing movement side of a tip end portion of the door panel and toward a vehicle right and left direction lateral side, along a vertical direction of the door panel, and detects catching of a foreign material occurred between the tip end portion of the door panel and the vehicle side wall.

In the sliding door in which the foreign material detector for a sliding door with the above-described structure is applied, the gate provided in the side wall of the vehicle is opened and closed by the door panel performing an opening and closing movement along a longitudinal direction of the vehicle. However, at a point immediately before the gate is closed (i.e., at a point immediately before the door panel reaches an end point of the closing movement thereof), the door panel moves toward the closing direction which is leaned with respect to the vehicle longitudinal direction. Therefore, when the door panel closes the gate, the tip end portion of the door panel (specifically, the closing movement direction side end portion of the door panel) is positioned at a lateral side of the side wall of the vehicle along the vehicle transverse direction.

On the other hand, in a case in which the foreign material is caught between the door panel and the side wall of the vehicle when the door panel closes the gate, the door panel applies a pressing force to the foreign material, and the pressed reaction force acted from the foreign material at the time is applied to the door panel.

Meanwhile, as described above, in a structure in which the door panel is moved toward the closing direction which is leaned with respect to the vehicle longitudinal direction at a point immediately before the gate is closed, orientations of the above-described pressing force and pressed reaction force are leaned with respect to the vehicle longitudinal direction.

Moreover, in a state in which the door panel gate is closed, the tip end portion of the door panel is positioned at the lateral side of the side wall of the vehicle along the vehicle transverse direction. Therefore, when the foreign material is caught between the door panel and the side wall, the pressing force applied from the door panel to the foreign material may act not only in a direction in which the foreign material is compressed along the closing direction, but also in a direction in which the foreign material is sheared.

Here, in the present invention (the foreign material detector for a sliding door), the pressure sensor is provided at the closing movement side of the tip end portion of the door panel and at a position displaced toward a vehicle right and left direction (vehicle transverse direction) lateral side of the tip end portion of the door panel. Therefore, the pressed reaction force effected from the foreign material which is in a caught state reliably acts upon the pressure sensor, compared with a case in which the pressure sensor is simply provided at the tip end portion of the door panel. Accordingly, the state of catching the foreign material can be reliably detected, even in the sliding door as described above.

Preferably, in the foreign material detector according to the second aspect of the present invention, the closing movement direction of the door panel is set to a direction which is leaned toward a vehicle transverse direction interior side with respect to the vehicle longitudinal direction, while the pressure sensor is provided at a position which is displaced from the tip end portion of the door panel toward the interior side of the vehicle.

In the foreign material detector for a sliding door with the above-described structure, the closing direction of the door panel is a direction which is leaned toward the vehicle transverse direction interior side with respect to the vehicle longitudinal direction, and the pressure sensor is displaced from the tip end portion of the door panel toward the interior side of the vehicle. Therefore, in a case in which the door panel is about to insert the foreign material between the door panel and the side wall of the vehicle, the foreign material comes into contact with the pressure sensor prior to the tip end portion of the door panel coming into contact therewith, so that the state of catching the foreign material can be readily and reliably detected.

More preferably, the foreign material detector for a sliding door according to the second aspect of the present invention is characterized by a pressure sensor comprising: an outer cover portion which is hollow and formed of a synthetic resin material which is elastically deformable due to the pressed reaction force; a plurality of wires which are provided in an inner side of the outer cover portion and come into contact to connect to each other due to the elastic deformation of the outer cover portion; and a retaining portion which has a rigidity higher than the outer cover portion and retains the outer cover portion at a side opposite to the closing movement direction or the closing direction of the outer cover portion.

In the foreign material detector for a sliding door with the above-described structure, when the outer cover portion which is hollow and forms the pressure sensor is elastically deformed by the pressed reaction force effected from the foreign material, electrodes of the plurality of wires provided within the outer cover portion come into contact to connect to each other due to the elastic deformation of the outer cover portion. By detecting this electrical conduction, the state of catching the foreign material can be detected.

Here, though the outer cover portion is retained by the retaining portion from the direction opposite to the closing movement or the closing direction, the pressure sensor held by the retaining portion is positioned at the closing movement direction side or closing direction side of the closing movement direction side end portion of the door panel. Thus, the pressure-sensor does not abut the closing movement direction side end portion of the door panel before the foreign material elastically deforms the outer cover portion, so that reliable detection of the foreign material is enabled.

More preferably, in the foreign material detector for a sliding door according to the second aspect of the present invention, the pressure sensor is mounted to the door panel in a state in which a gap is formed between the pressure sensor and the tip end portion of the door panel.

In the foreign material detector for a sliding door with the above-described structure, since a gap is formed between the pressure sensor and the tip end portion of the door panel, the elastic deformation of the outer cover portion due to the pressed reaction force effected from the foreign material is not prevented by the interference of the closing movement direction side end portion of the door panel. Accordingly, it is ensured that the outer cover portion is elastically deformed by the pressed reaction force effected from the foreign material, and the electrodes provided within the outer cover portion come into contact to connect to each other. Thus, reliability of the present foreign material detector for a sliding door increases.

More preferably, the foreign material detector for a sliding door according to the second aspect of the present invention is characterized by including: a supporting device which is integrally mounted to the door panel at a side opposite to the closing movement direction of the pressure sensor; and a retainer in which a groove portion into which the supporting device can enter from a side opposite to the closing movement direction is formed and which comprises a nipping portion which nips a tip end portion of the supporting device entered into the groove portion from both sides thereof, while retaining the pressure sensor.

In the foreign material detector for a sliding door with the above-described structure, the supporting device enters the groove portion formed in the retainer which retains the pressure sensor, the tip end portion of the supporting device is nipped from both sides thereof by the nipping portion of the retainer, the supporting device is further integrally mounted to the door panel, the pressure sensor is thereby indirectly mounted to the door panel and supported.

Here, as described above, the tip end portion of the supporting device entered into the groove portion is nipped from both sides thereof by the nipping portion. Therefore, the nipping portion interferes with the tip end portion of the supporting device, and displacement of the supporting device is regulated.

Relative displacement between the supporting device and the retainer due to the above-described external forces can thereby be prevented, and the pressure sensor can always be retained at a preset position. Therefore, a constant detection performance can be continually maintained. Moreover, there is a sufficient possibility that the external forces as described above arise at the time of mounting the pressure sensor and at the time of joining the retainer to the supporting device. However, since a change in a position of the pressure-sensor due to such an external force is prevented, sufficient external forces can be applied to the pressure sensor and the retainer and reliable mounting can thus be carried out, while it is not necessary to concern about the external force at the time of mounting, which improves workability.

A third aspect of the present invention is a method for detecting a foreign material caught in a sliding door device, in which a door panel performs an opening and closing movement in a vehicle longitudinal direction, the door panel moves toward a closing direction which is leaned with respect to the vehicle longitudinal direction immediately before a closing movement direction side end portion of the door panel reaches a closing movement end point located at a lateral side of a vehicle side wall along a substantial orthogonal direction with respect to a closing movement direction, a gate provided in the vehicle side wall is thereby closed; the method comprising a step of: detecting a foreign material which intersects the closing movement direction of the door panel and impedes closing of the door panel by a pressure sensor extending at the closing movement direction side of a tip end portion of the door panel and mounted to an outside of the door panel.

DESCRIPTION OF THE PREFERRED EMBODIMENTS

Figure 9:
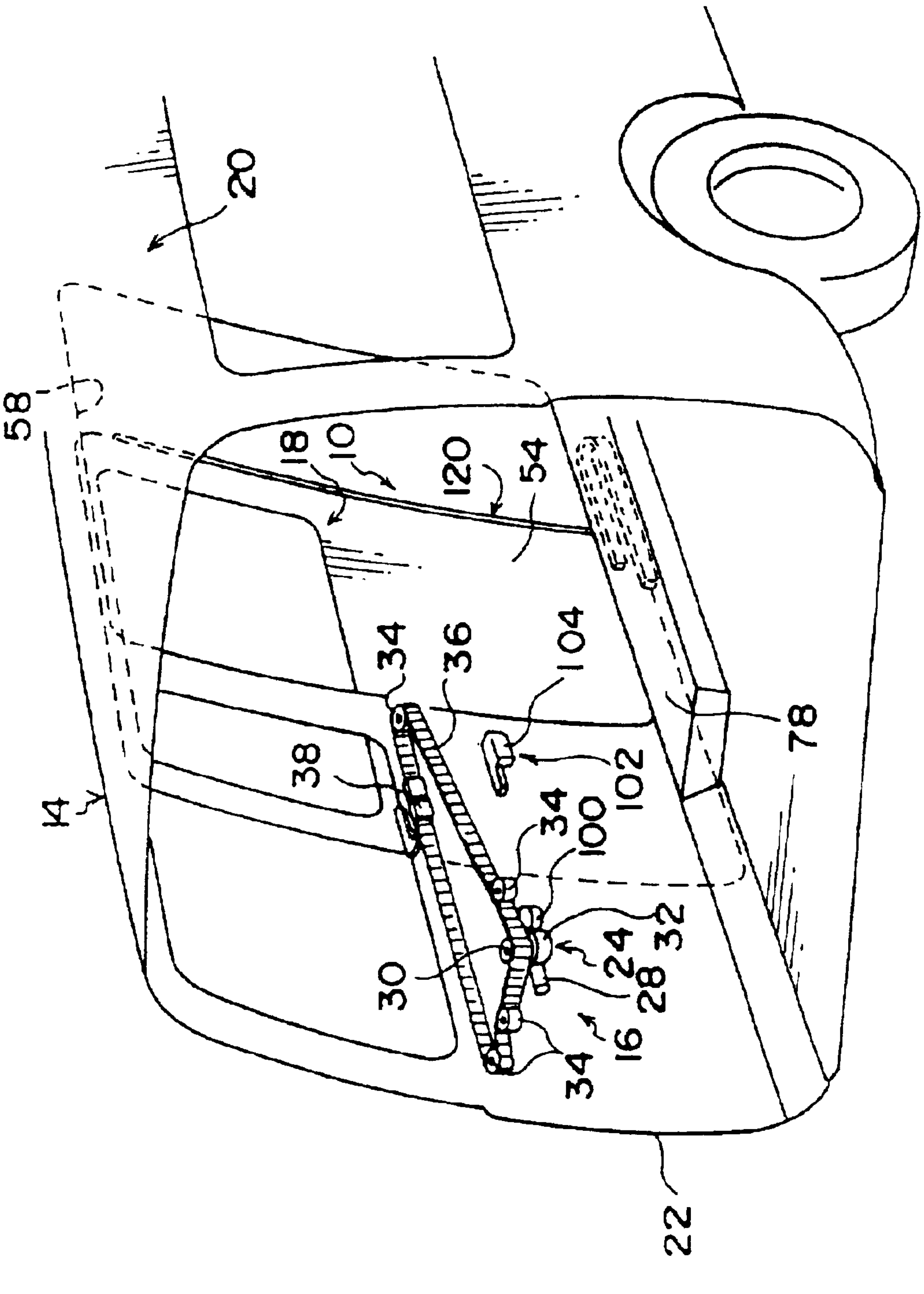
FIG. 9 is a perspective view from a rear of the vehicle to which the foreign material detector relating to the embodiment of the present invention is applied.

FIG. 9 shows a perspective view of a vehicle 14, in which a foreign material detector 10 relating to an embodiment of the present invention is adopted for detecting a door panel 18 (a movable body) catching a foreign material in an automatic sliding door device 16 (an opening and closing mechanism). Prior to a description of a structure of this foreign material detector 10, first of all, a description of a structure of an automatic sliding door device 16 will be given.

<Structure of the automatic sliding door device 16>

As shown in FIG. 9, the automatic sliding door device 16 includes a sliding door actuator 24 provided at a vehicle vertical direction intermediate portion of a side wall 22 (a vehicle body 20) in a rear end side of the vehicle 14. The sliding door actuator 24 includes a sliding door motor 28 which is electrically connected to a battery disposed within an engine room (illustration of any of which without a reference numeral is omitted) located at a front end side of the vehicle body 20 or below a driver's seat through a connecting device such as a harness and a cable.

A reduction gear 32 is provided at a lateral side of the sliding door motor 28. This reduction gear 32 contains a plurality of gears which includes a gear engaged with an output axis of the sliding door motor 28. Rotation of the sliding door motor 28 is transmitted, while being decelerated, by these gears externally to a driving pulley 30, this driving pulley 30 is thereby rotated.

The driving pulley 30 is rotatable around an axis provided such that an axial direction thereof is substantially a vehicle vertical direction. An endless belt 36 is wound around the driving pulley 30 and a plurality of driven pulleys 34 provided spacing apart from this driving pulley 30. When the sliding door motor 28 starts driving and the driving pulley 30 is rotated, the endless belt 36 is followingly rotated.

Figure 11:
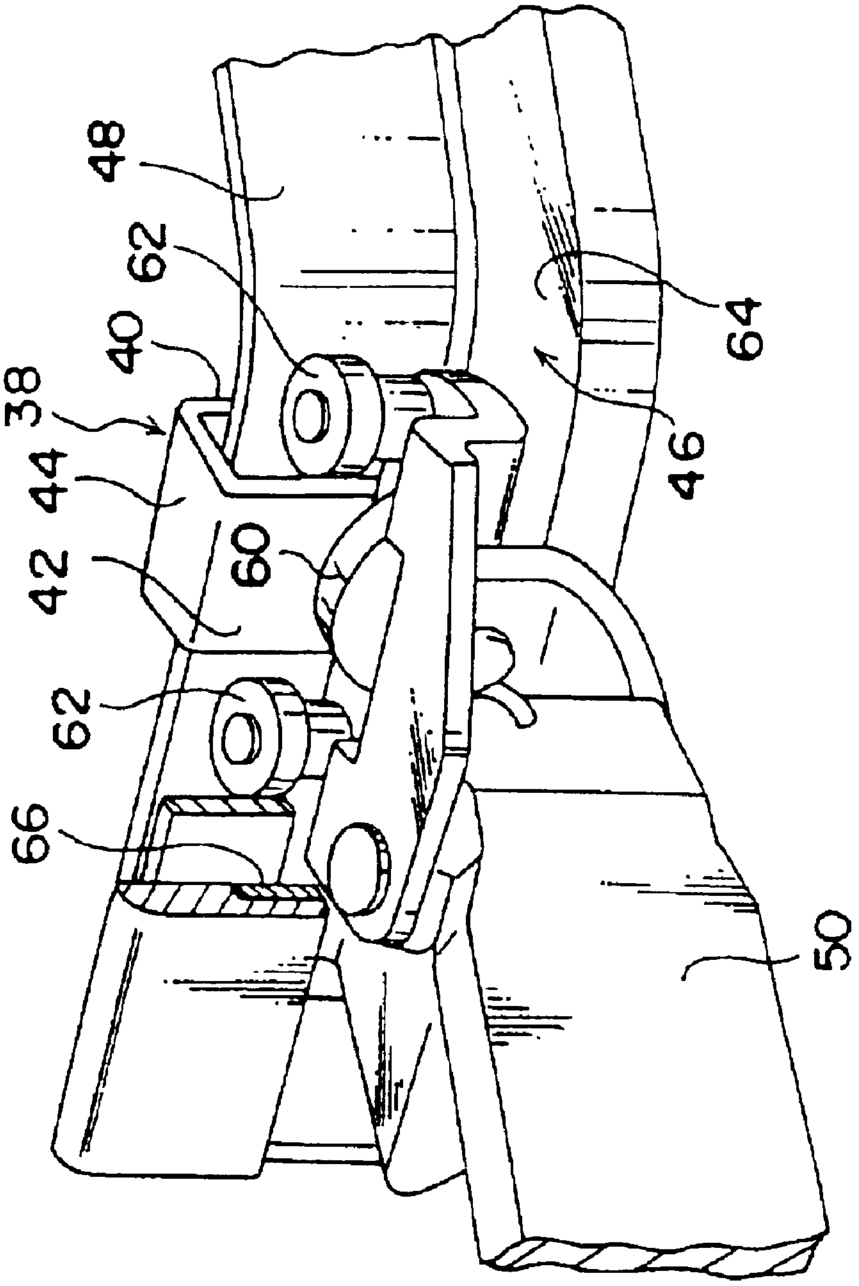
FIG. 11 is a perspective view in which the vicinity of a center rail of an automatic sliding door device is expanded.

As shown in FIG. 9, an attachment 38 is integrally secured to a portion in a longitudinal direction of the endless belt 36. As illustrated in FIG. 11, the attachment 38 is a member which is generally opened downwards and U-shaped, and in which a side wall portion 40, a side wall portion 42 facing the side wall portion 40 generally along a substantial vehicle transverse direction, and a connecting portion 44 connecting each of the upper end portions of the side wall portion 40 and the side wall portion 42 together. The attachment 38 straddles over a side wall portion 48 of a center rail 46 provided at the vertical direction intermediate portion of the side wall 22 such that the longitudinal direction thereof is along the vehicle longitudinal direction. (That is, the side wall portion 40 and the side wall portion 42 oppose to each other through the side wall portion 48.) The side wall portion 42 of the attachment 38 is fixed to a tip end portion of the door panel 18, and is connected through a center arm 50 to an inner panel 54 which forms the door panel 18. When the endless belt 36 is rotated, the door panel 18 slides along the rotating direction.

Figure 1:
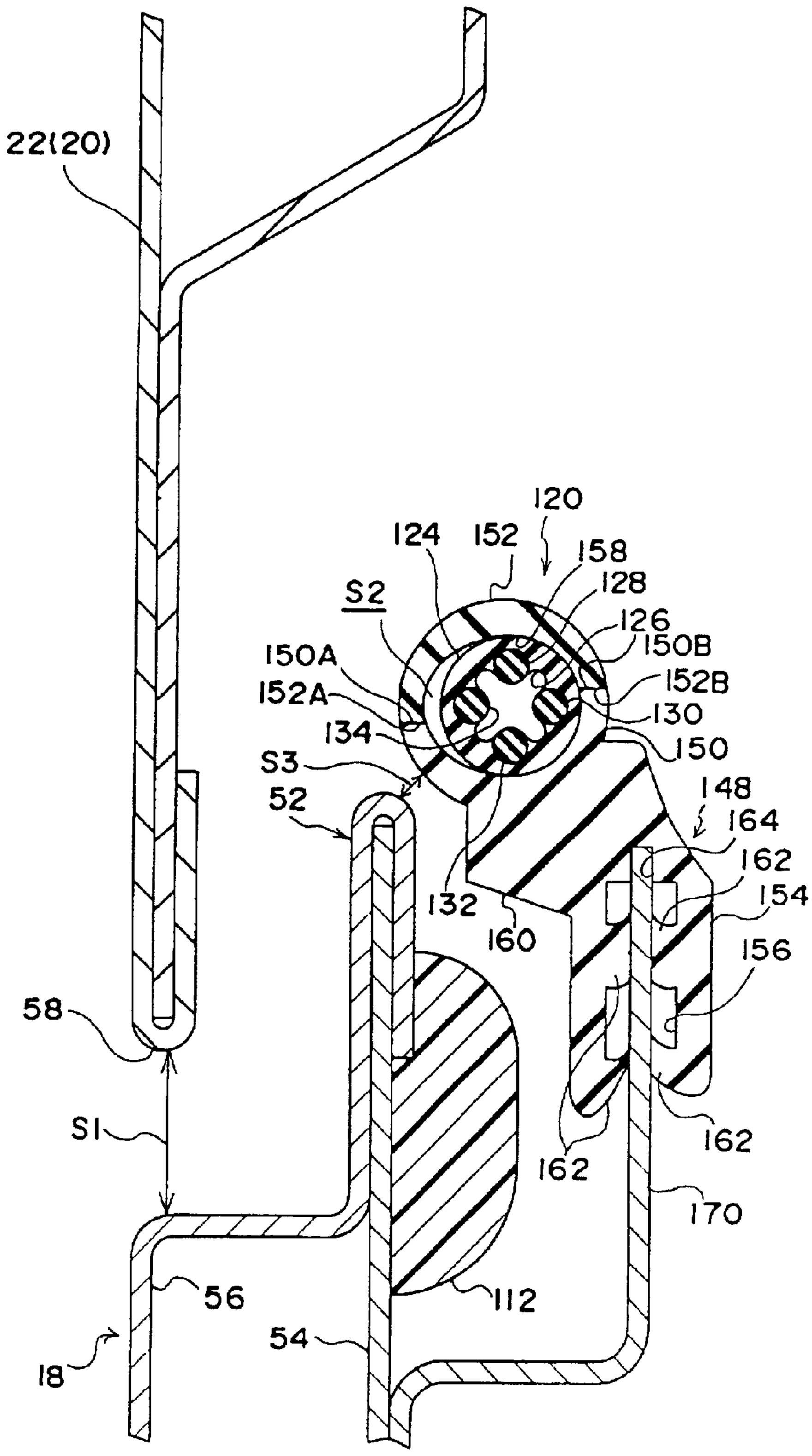
FIG. 1 is an expanded sectional view of a principal part of a vehicle to which a foreign material detector relating to an embodiment of the present invention is applied.

As shown in FIG. 1, the door panel 18 is formed by the inner panel 54 and an outer panel 56 relatively positioned at a substantial vehicle outer side with respect to this inner panel 54. However, a substantial vehicle front side end portion of the outer panel 56 is bent substantially toward a vehicle interior side so as to adjacent to the inner panel 54. The outer panel 56 is bent along the inner panel 54 and substantially toward a front side of the vehicle in a very vicinity of the inner panel 54. Further, in a very vicinity of a substantial vehicle front side end portion of the inner panel 54, the outer panel 56 is folded over the inner panel 54 so as to enclose the substantial vehicle font side end portion of the inner panel 54. The outer panel 56 and the inner panel 54 are sealed by a hem sealer 112 at a tip end portion of the outer panel 56 folded over the substantial vehicle font side end portion of the inner panel 54. A portion of the outer panel 56, which is from the portion where the outer panel 56 is bent substantially toward the vehicle front side at the very vicinity of the inner panel 54 to the portion where the outer panel 56 is folded over the inner panel 54 at the very vicinity of the substantial vehicle front side end portion of the inner panel 54, is defined as a hem 52 (a laminated portion). A coating similar to the side wall 22 is applied to a vehicle transverse direction outer surface of this hem 52.

The door panel with the above-described structure is formed corresponding to an entrance 58 (see FIG. 9) formed in the side wall 22 as a gate which has a substantially elongated form and is for passengers getting in and out. The entrance 58 can be closed by the door panel 18 being moved until it substantially fits into the entrance 58 (i.e., by the door panel 18 being moved until a movement end point of its closing movement). Moreover, as shown in FIG. 1, in a closed state of the door panel 18, an exterior surface of the outer panel 56 of the door panel 18 is substantially coplaner with an exterior surface of the side wall 22, while at least a portion of the above-described hem 52 is overlapped with the side wall 22 at a vehicle interior side of the side wall 22 substantially along the vehicle transverse direction.

As described above, the coating which is the same as that applied to the side wall 22 is applied to the vehicle transverse direction outer surface of the hem 52. Therefore, even when a gap S1 is produced between an inner peripheral portion of the entrance 58 and a portion of the door panel 18 located substantially at a vehicle rear side of the hem 52, the coating coated on the hem 52 which is the same as that applied to the side wall 22 can be seen. Accordingly, deterioration in appearance quality caused by such a gap S1 can be suppressed or otherwise be prevented.

On the other hand, as illustrated in FIG. 11, a roller 60, an axial direction of which is substantially along the vehicle transverse direction and which rotates around an axis thereof, and a pair of rollers 62, axial directions of which are substantially along the vertical direction of the vehicle 14 and which rotate around axes thereof, are each axially supported at a tip end portion of the center arm 50. An outer peripheral portion of the roller 60 abuts a bottom wall portion 64 of the center rail 46 and rolls thereon. On the other hand, outer peripheral portions of the pair of rollers 62 abut a side wall 66 provided so as to oppose the center rail 46 substantially at a vehicle transverse direction outer side of the center rail 46. The pair of rollers 62 roll in a state in which they abut the side wall portion 66, while the displacement thereof toward the substantial vehicle transverse direction exterior side is restricted by the side wall portion 66.

Figure 10:
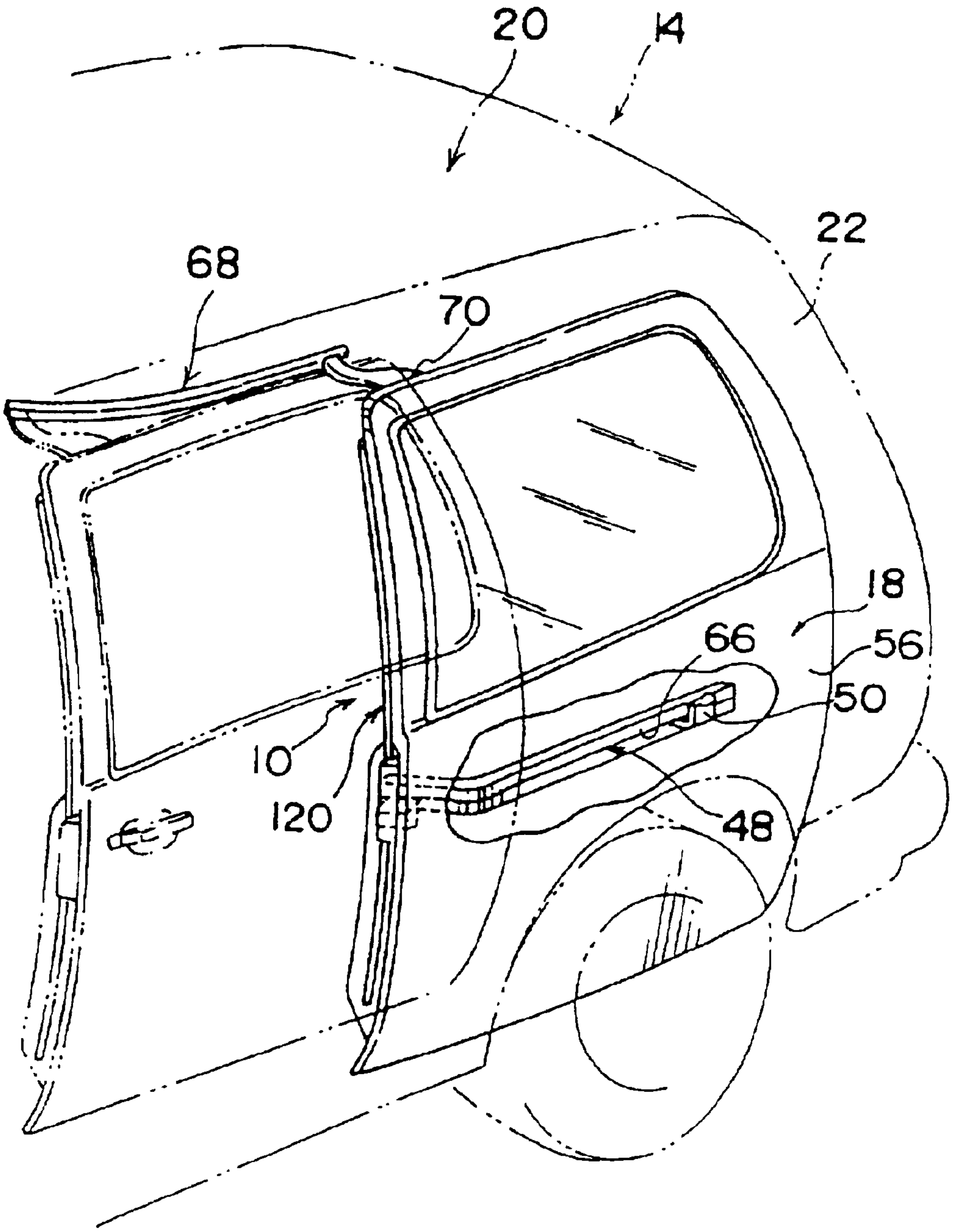
FIG. 10 is a perspective view from a front of the vehicle to which the foreign material detector relating to the embodiment of the present invention is applied.

Meanwhile, as shown in FIG. 10, a front end side of the center rail 46 is leaned substantially toward the vehicle transverse direction interior side. Therefore, when the door panel 18 fitted into the entrance 58 slides toward the rear side of the vehicle 14, rollers 62 are first guided by the side wall portion 66 at the front end side of the center rail 46, the door panel 18 thereby moves toward the vehicle transverse direction exterior side (i.e., in a direction opposite to arrow A in FIG. 2), while sliding toward the rear of the vehicle 14. From a state in which the door panel 18 is positioned substantially at the vehicle transverse direction exterior side of the side wall 22, the door panel 18 then slides toward the vehicle rear substantially along the vehicle transverse direction in a state in which the door panel 18 opposes the side wall 22.

Figure 12:
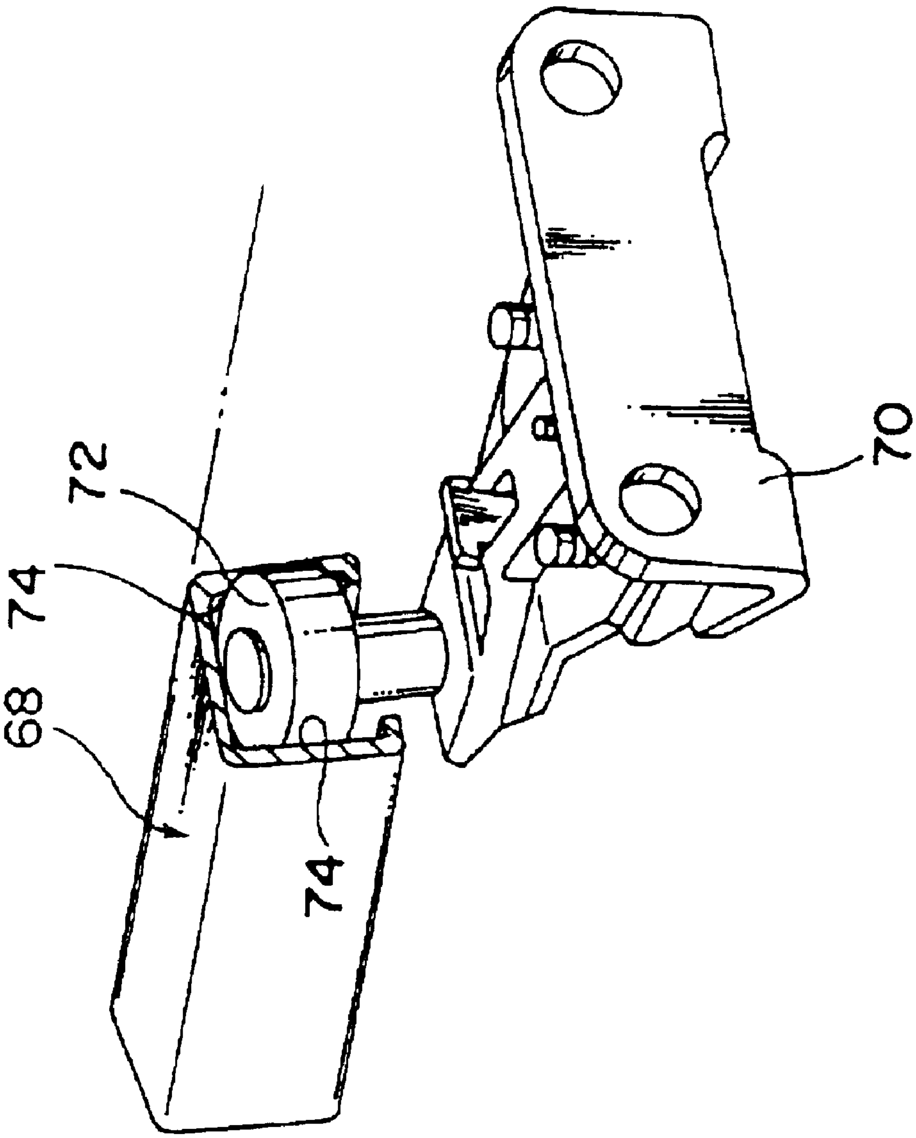
FIG. 12 is a perspective view in which the vicinity of an upper rail of the automatic sliding door device is expanded.

On the other hand, as shown in FIG. 10, an upper rail 68 is provided in the vicinity of the upper end portion of the side wall 22 along the upper end portion of the entrance 58. As shown in FIG. 12, the upper rail 68 has a U-shaped cross-section which is opened downwardly. A roller 72, an axial direction of which is substantially the vertical direction of the vehicle 14 and which is axially supported at a tip end portion of an upper arm 70 so as to be rotatable around an axis thereof, is entered within the upper rail 68. The upper rail 68 includes a pair of side wall portions 74 provided substantially along the vehicle transverse direction facing each other. An outer peripheral portion of the roller 72 abuts one of the pair of side wall portions 74 which is located substantially at the vehicle transverse direction exterior side so that the roller 72 rolls in a state in which it abuts the side wall portion 74 provided substantially at the vehicle transverse direction exterior side, while displacement thereof substantially toward the vehicle transverse direction exterior side is restricted by the pair of side wall portions 74.

A base end portion of the upper arm 70 is secured in the vicinity of an upper end portion of the inner panel 54 by a fastening device such as bolts (illustration thereof is omitted). The movement of the door panel 18 toward the substantial vehicle transverse direction exterior side is restricted by the movement of the roller 72 toward the substantial vehicle transverse direction exterior side being restricted by the pair of side wall portions 74. Further, a front end side of the upper rail 68 is leaned substantially toward the vehicle transverse direction interior side as well as the front end portion of the center rail 46. When the rollers 62 are guided by the side wall portion 66 at the front end side of the center rail 46, the roller 72 is guided by the upper rail 68 at the front end side of the upper rail 68.

Figure 13:
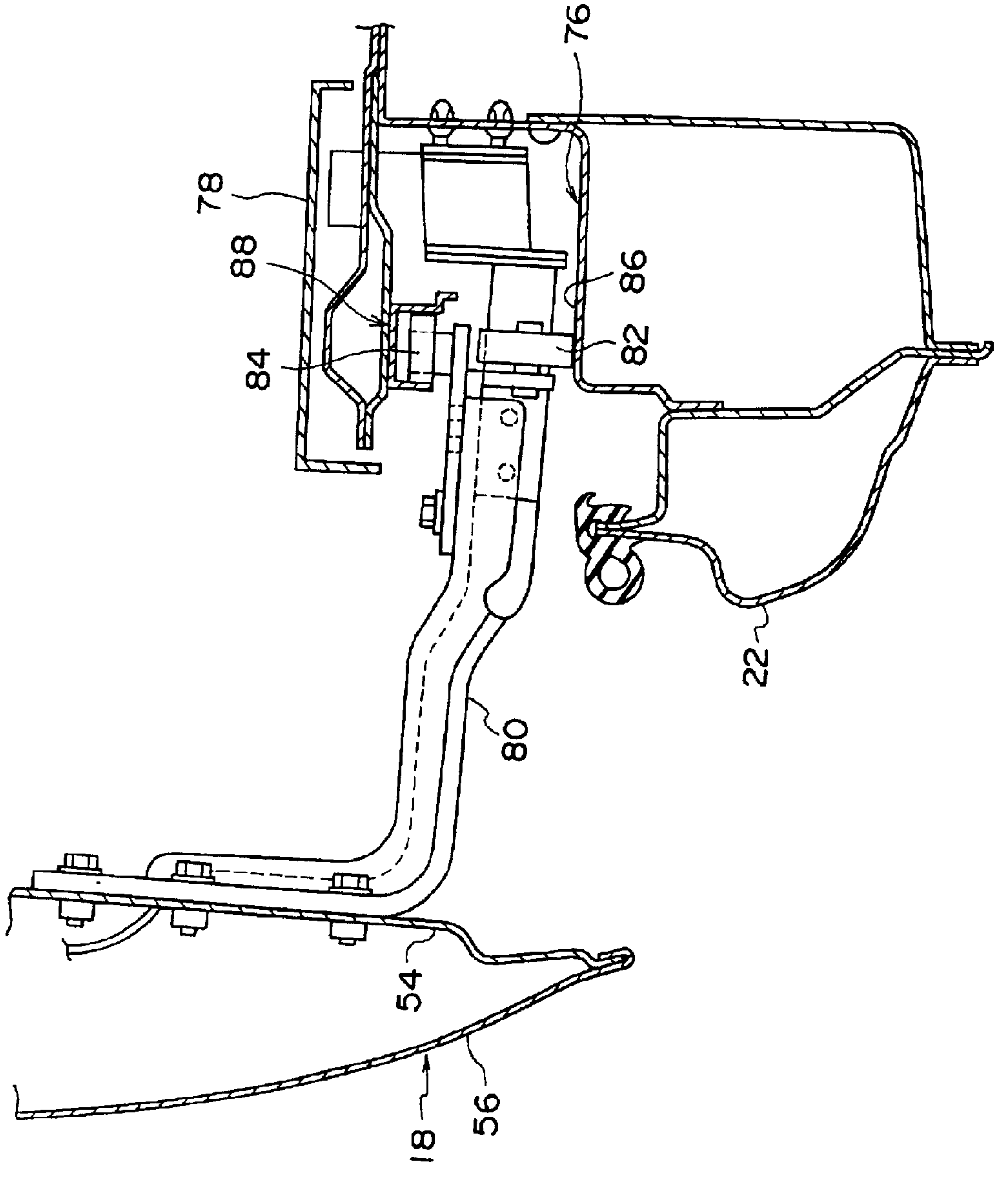
FIG. 13 is a vertical sectional view in which the vicinity of a lower rail of the automatic sliding door device is expanded.
Figure 14:
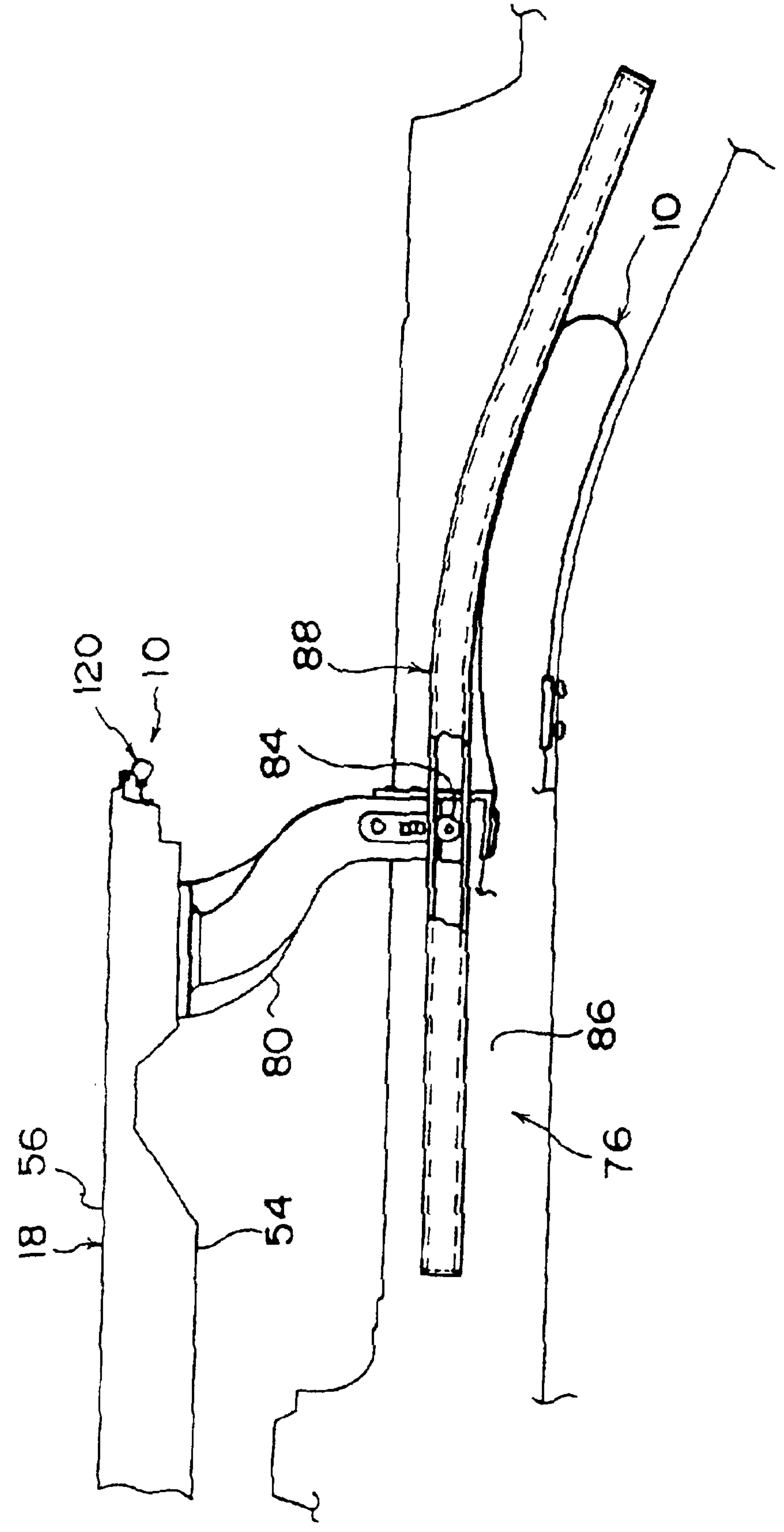
FIG. 14 is a plan view in which the vicinity of a lower rail of the automatic sliding door device is expanded.

As shown in FIGS. 13 and 14, a lower rail 76 is provided along a lower end portion of the entrance 58 in the vicinity of a lower end portion of the side wall 22. The lower rail 76 is provided below a step 78 which forms a part of a floor portion of the vehicle 14. The lower rail 76 has a U-shaped cross-section which is substantially opened toward the substantial vehicle transverse direction exterior side.

A tip end side of the lower arm 80 enters an inner side of the lower rail 76. A roller 82, an axial direction of which is substantially along the vehicle transverse direction and which rotates around an axis thereof, and a roller 84, the axial direction of which is substantially along the vertical direction of the vehicle 14 and which rotates around an axis thereof, are each axially supported at a tip end of the lower arm 80. An outer peripheral portion of the roller 82 abuts a lower wall portion 86 of the lower rail 76 and the roller 82 rolls on the lower wall portion 86.

On the other hand, the roller 84 enters inside a guide rail 88 having a U-shaped cross-section opened downwardly. The guide rail 88 is secured to an upper wall portion of the lower rail 76. An outer peripheral portion of the roller 82 abuts one of a pair of the side wall portions located substantially at the vehicle transverse direction exterior side, between the pair of side wall portions provided substantially along the vehicle transverse direction facing each other. The roller 82 rolls in a state in which it abuts one of the side wall portions, while the displacement thereof toward the substantial vehicle transverse direction exterior side is restricted by the side wall portion located substantially at the vehicle transverse direction exterior side. Further, a front end side of the guide rail 88 is also leaned substantially toward the vehicle transverse direction interior side as well as the front end side of the center rail 46. When the roller 60 is guided by the side wall portion 66 at the front end side of the center rail 46, the roller 84 is guided by the side wall portion at the front end side of the guide rail 88.

In other words, the door panel 18 is slidably mounted to the vehicle body 20 on a track which is substantially along the longitudinal direction of the vehicle 14 through the rollers 62 of the center arm 50, the roller 72 of the upper arm 70, and the roller 84 of the lower arm 80. By driving the sliding door motor 28 of the sliding door actuator 24 normally or reversely, the sliding door motor 28 slides toward the back or the front of the vehicle 14 to open and close the entrance 58.

Figure 8:
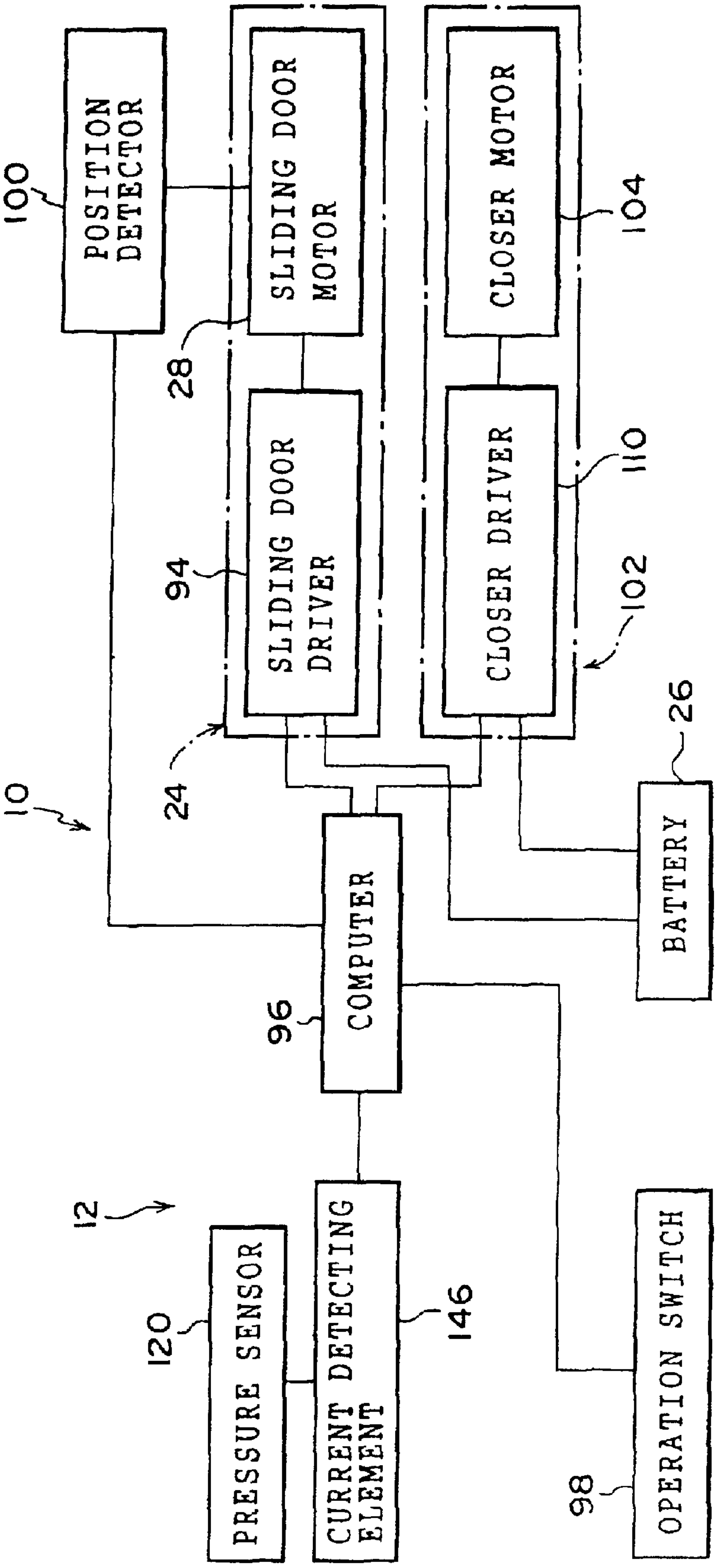
FIG. 8 is a block diagram illustrating a structure of the foreign material detector relating to the embodiment of the present invention.

As illustrated in a block diagram in FIG. 8, the sliding door actuator 24 comprises a sliding door driver 94 formed by a control circuit such as a relay and is electrically connected to the battery 26 via the sliding door driver 94. The sliding door driver 94 is connected to the battery 26 via a computer 96 which serves as a determination device. For example, when an operation switch 98 provided in the vicinity of a driver's seat in the vehicle 14 is operated, the computer 96 transmits a signal responding to a switching state of the operation switch 98 at the time to the sliding door driver 94 and allows the sliding door motor 28 to drive normally or reversely, or otherwise stops the sliding door motor 28.

Further, the automatic sliding door drive 16 includes a location detector 100 which detects the sliding amount of the door panel 18 by counting a revolution of an output axis of the sliding door motor 28.

As illustrated in FIG. 8, the automatic sliding door device 16 includes a closer actuator 102 provided at the vehicle body 20. The closer actuator 102 comprises a closer motor 104. When the door panel 18 is slid until a pair of junctions (illustration thereof is omitted), which are respectively provided at a closing movement direction side end portion of the door panel 18 and the inner peripheral portion of the entrance 58 which opposes the closing movement direction side end portion of the door panel 18, are electrically connected to each other and becomes a so-called door ajar state, the closer motor 104 is energized and initiates driving so that the door panel 18 is completely closed. At this time, the sliding amount of the door panel 18 is detected by the location detector 100, the computer 96 thereby operates the sliding door driver 94, stops an energization from the battery 26 to the sliding door motor 28, and thus stops the sliding door motor 28. When the closer motor 104 allows the door panel 18 to slide and a latch switch (illustration thereof is omitted) of the closer actuator 102 detects the fact that the door panel 18 is slid, the door panel 18 is locked through a mechanical transmission device such as a link mechanism.

<Structure of a foreign material detector 10>

Next, a structure of the foreign material detector 10 will be described.

As shown in FIGS. 9 and 10, the foreign material detector 10 includes a pressure sensor 120. Generally, the pressure sensor 120 is elongated substantially along the vehicle vertical direction and disposed along the hem 52 at a vehicle interior side of the hem 52 which is a closing movement direction side end portion of the door panel 18, as illustrated in FIG. 1. The pressure sensor 120 includes an outer cover portion 124 which is formed in an elongated form and of an elastic material having an insulating property such as a rubber and a soft synthetic resin material. Inside the outer cover portion 124, a cross hole 126 having a cross-shaped cross-section is formed along a longitudinal direction of the outer cover portion 124. The cross hole 126 is successively displaced around a center of the outer cover portion 124 along the longitudinal direction of the outer cover portion 124.

Figure 6:
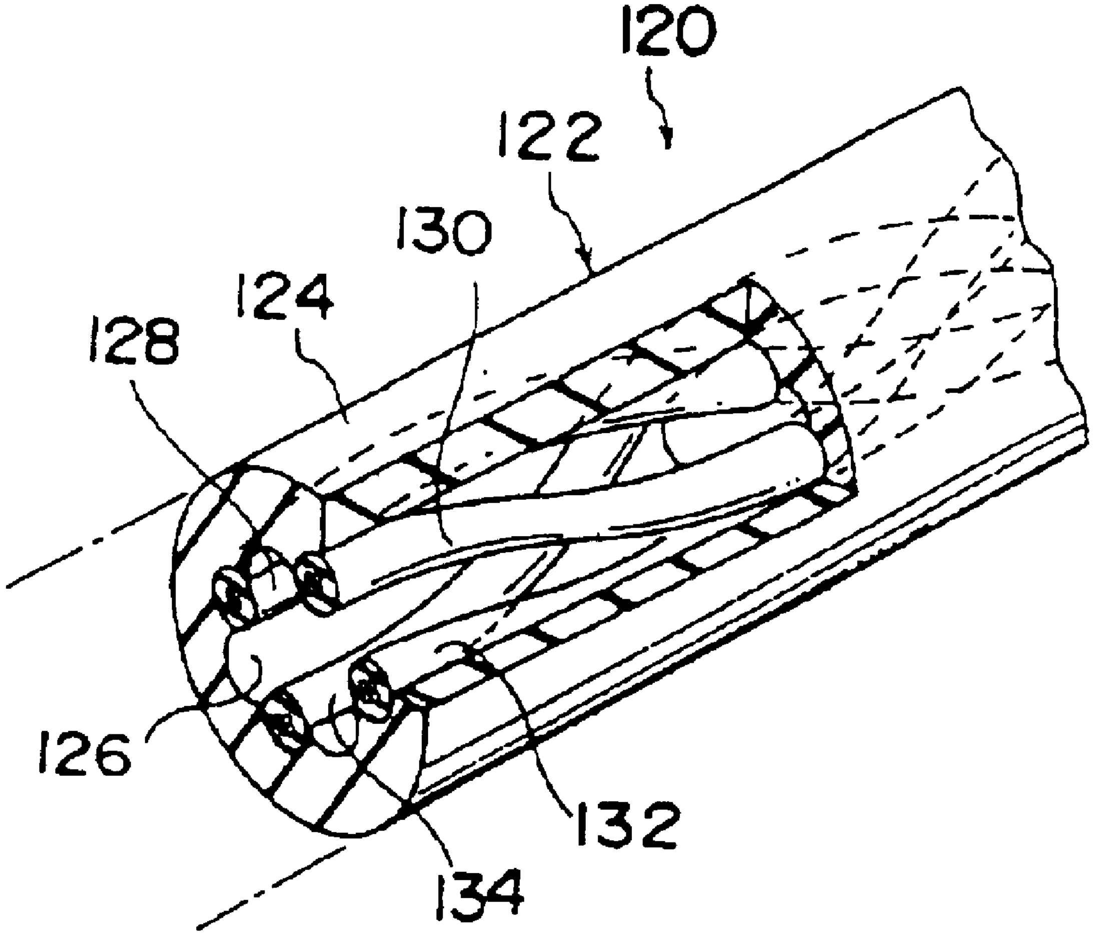
FIG. 6 is a perspective view illustrating a structure of a pressure sensor.

Further, a plurality of wires 128, 130, 132, and 134, each of which has an electrode coated with a conductive rubber and is formed by twisting conductive thin wires such as copper wires together to an elongated cord with a flexibility, are provided in an inner side of the outer cover portion 124. As shown in FIG. 6, these wires 128–134 are spirally disposed in the vicinity of the center of the cross hole 126 along the cross hole 126 and in a state in which they are spaced from one another through the cross hole 126, and integrally secured to an inner peripheral portion of the cross hole 126. Accordingly, by the outer cover portion 124 being elastically deformed, the wires 128–134 are deflected. Particularly, if the outer cover portion 124 is elastically deformed to the extent that the cross hole 126 is smashed, the wire 128 or the wire 132 comes into contact and connects to the wire 130 or the wire 134. Moreover, if the outer cover portion 124 recovers, the wires 128–134 recover as well.

Figure 2:
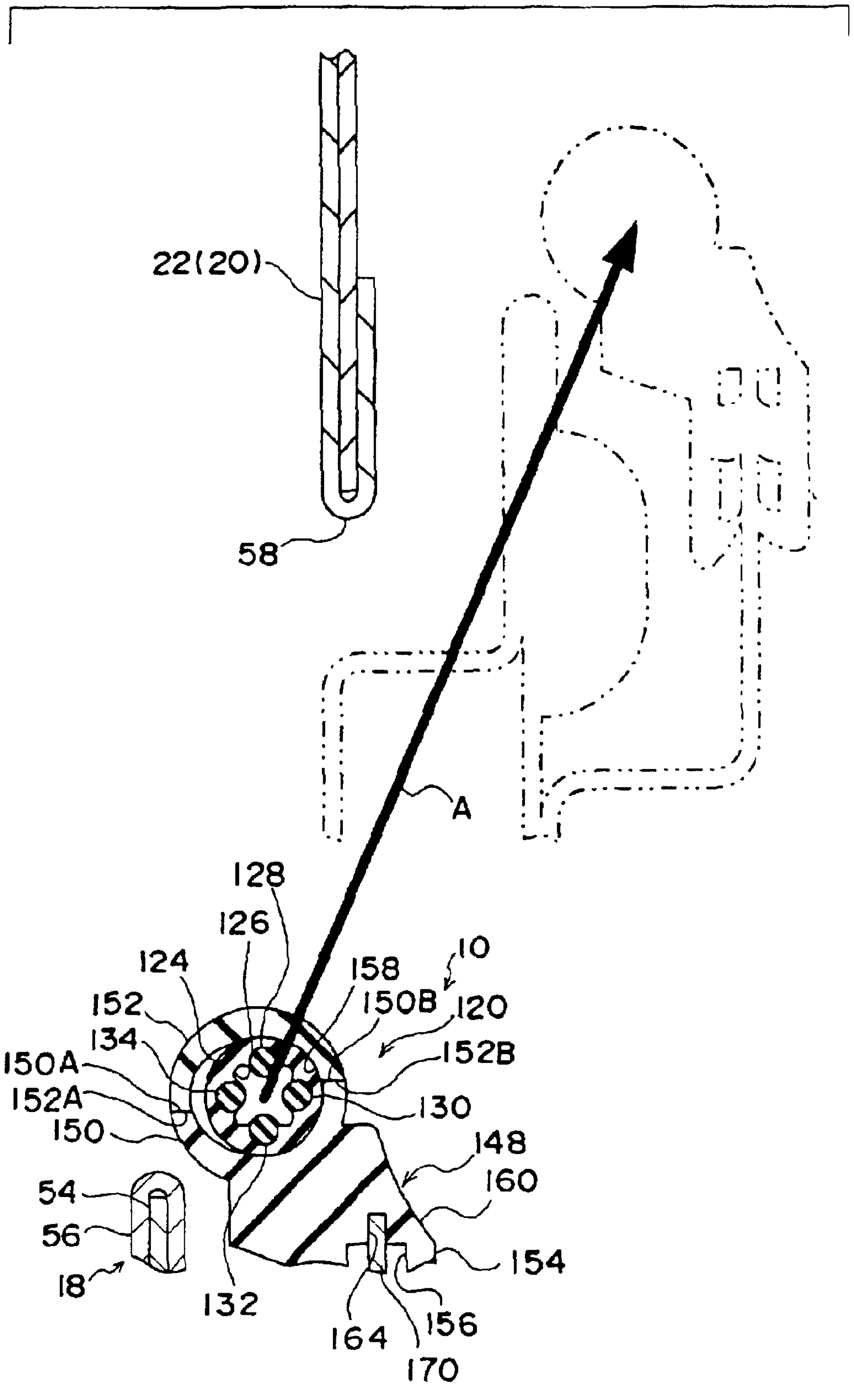
FIG. 2 is an expanded sectional view of a principal part illustrating a closing movement direction of a movable body.
Figure 7:
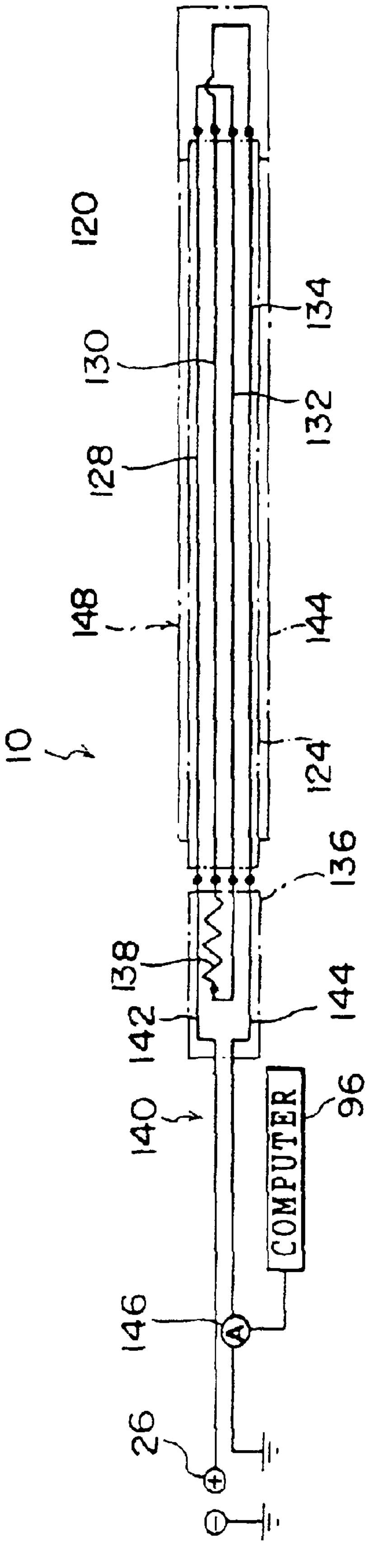
FIG. 7 is a circuit diagram illustrating a structure of the pressure sensor.

Further, as illustrated in a circuit diagram in FIG. 7, the wire 128 and the wire 132 are connected to each other at longitudinal direction one end portions thereof, and the wire 130 and the wire 134 are also connected to each other at longitudinal direction one end portions thereof. On the other hand, as illustrated in FIGS. 1 and 2, a connector 136 is disposed between the inner panel 54 and the outer panel 56 which form the door panel 18. As illustrated in the circuit diagram in FIG. 7, a resistance 138 is provided inside the connector 136. One end portion of the wire130, which is not connected to the wire 134, is electrically connected to one end of the resistance 138. One end portion of the wire 132, which is not connected to the wire 128, is electrically connected to the other end of the resistance 138. Accordingly, the wire 130 and the wire 132 are electrically connected to each other through the resistance 138.

Further, longitudinal direction one end portions of a pair of wires 142, 144 of a lead wire 140 are respectively accommodated inside the connector 136 and fixed to a terminal provided within the connector 136. Each of the longitudinal direction one end portions of the above-described wires 128, 134 which are the other of the end portions respectively conducted with the wire 132 or the wire 130 is secured to the terminal to which these wires 142, 144 are respectively fixed. Accordingly, the wire 142 and the wire 128 are electrically connected, and the wire 144 and the wire 134 are electrically connected.

The wire 142 is directly or indirectly connected to the battery 26 through other connecting members (the wire 142 and the battery 26 are directly connected in the circuit diagram in FIG. 7, for convenience). Further, the wire 144 is connected to the battery 26 via a current detecting element 146 which disconnects the circuit when an electric current having a predetermined value or greater flows. In other words, the electric current, which flows from the wire 128 to the wire 134 via the wires 130, 132, normally flows through the resistance 138. If the outer cover portion 124 is temporarily crushed and the wire 128 or the wire 132 comes into contact and connects to the wire 130 or the wire 134 and the circuit is thus short-circuited, the electric current flows without undergoing the resistance 138. This results in a state where the value of the electric current changes, for example, if the electric current is flowing this circuit with a constant voltage. Therefore, if the change in the value of the electric current is detected at the time, whether or not the outer cover portion 124 is crushed, i.e., whether or not an external force acted upon the outer cover portion 124, can be detected.

As illustrated in FIGS. 7 and 8, the current detecting element 146 is connected to the computer 96. When the current detecting element 146 detects that an electric current with a predetermined value or greater flowed in the circuit, i.e., that the wire 128 or the wire 132 came into contact and connected to the wire 130 or the wire 134 and the circuit was thus short-circuited, the computer 96 operates the sliding door driver 94 and the closer driver 110 and allows the sliding door motor 28 and the closer motor 104 to drive reversely.

As shown in FIG. 1, the above-described outer cover portion 124 is held in a state in which it is caught inside a protector 148 which is formed in an elongated tubular shape and serves as a supporting member.

The protector 148 includes a recessed portion 150 which has a recessed shape and forms an accommodating portion opened toward the front side of the vehicle 14, and a flexible portion 152 which has a recessed shape and forms an accommodating portion opened toward the rear side of the vehicle 14. The recessed portion 150 is formed of a synthetic resin material or a rubber material having a rigidity which is equivalent to or lower than that of the outer cover portion 124. In contrast, the flexible portion 152 is formed of a synthetic resin material or a rubber material having a rigidity which is lower than that of the recessed portion 150.

The recessed portion 150 and the flexible portion 152 are integrally connected in a state in which the opening directions thereof oppose to each other, the recessed portion 150 and the flexible portion 152 thereby forms a tubular shape on the whole. A catching hole 158 is provided in an inner side of the recessed portion 150 and the flexible portion 152. At a vehicle interior side of a vehicle transverse direction intermediate portion of the catching hole 158, a radius of curvature of an inner peripheral portion of the recessed portion 150 and that of an inner peripheral portion of the flexible portion 152 are nearly equal to a radius of curvature of an outer peripheral portion of the above-described outer cover portion 124. At a vehicle exterior side of the intermediate portion of the catching hole 158, a radius of curvature of the inner peripheral portion of the recessed portion 150 and that of the inner peripheral portion of the flexible portion 152 are larger than a radius of curvature of the outer peripheral portion of the outer cover portion 124.

Therefore, the catching hole 158 generally does not have a circular cross-section and has a substantially oval or elliptical cross-section. At the vehicle interior side of the vehicle transverse direction intermediate portion of the catching hole 158, the outer peripheral portion of the outer cover portion 124 abuts the inner peripheral portion of the catching hole 158 and is nipped by the elasticity of both the recessed portion 150 and the flexible portion 152. At the vehicle exterior side of the vehicle transverse direction intermediate portion of the catching hole 158, a gap S2 is formed between the inner peripheral portion of the catching hole 158 and the outer peripheral portion of the outer cover portion 124.

This gap S2 reduces an interference from the inner peripheral portion of the catching hole 158 (i.e., from the recessed portion 150 and the flexible portion 152) against the outer cover portion 124 subjected to an external force from a direction tilted toward the vehicle transverse direction interior side with respect to the vehicle front side and about to elastically deform such that the portion 124 stretches toward the vehicle exterior side of the vehicle transverse direction intermediate portion of the catching hole 158. Therefore, the outer cover portion 124 can be elastically deformed readily and reliably by the external force effected from the direction tilted toward the vehicle transverse direction interior side with respect to the vehicle front side.

Further, as illustrated in FIG. 1, though a vehicle transverse direction exterior side end portion 150A of the recessed portion 150 is located substantially at a vehicle front side of the hem 52, it is formed so as to be located substantially at a vehicle rear side compared with a vehicle transverse direction interior side end portion 150B of the recessed portion 150. In correspondence to the vehicle transverse direction exterior side end portion 150A of the recessed portion 150, a vehicle transverse direction exterior side end portion 152A of the flexible portion 152 is formed so as to be located relatively at a vehicle rear side compared with a vehicle transverse direction interior side end portion 152B of the flexible portion 152. Therefore, the range of the recessed portion 150 and that of the flexible portion 152 are asymmetric, defining a boundary between the recessed portion 150 and the flexible portion 152 as a vehicle transverse direction central portion of the recessed portion 150 and the flexible portion 152, which causes the outer cover portion 124 to be elastically and easily deformed due to the external force effected from the direction leaned toward the vehicle transverse direction exterior side to the substantial vehicle front side of a center of the outer cover portion 124.

On the other hand, at a side of the recessed portion 150 where the recessed portion 150 leaned substantially toward the vehicle transverse direction inner side with respect to the substantial vehicle rear, a joining portion 160 is continuously formed from the outer peripheral portion of the recessed portion 150 (a surface facing the recessed portion 150). Further, at a side of this joining portion 160 where the joining portion 160 leaned substantially toward the vehicle transverse direction interior side with respect to the substantial vehicle rear, a mounting portion 154 which serves as a retainer is continuously formed from the joining portion 160. The joining portion 160, as well as the mounting portion 154, is formed of a material which is the same as a synthetic resin material or a rubber material forming the recessed portion 150.

Further, mounting grooves 156 are formed in the mounting portion 154. The mounting grooves 156 are formed in the mounting portion 154 so as to be displaced substantially toward the vehicle transverse direction interior side of the catching hole 158 and opened toward the rear side of the vehicle 14, while being formed substantially in a uniform manner and along longitudinal directions of the recessed portion 150 and the flexible portion 152. A bracket 170 which serves as a supporting device enters an inner side of the mounting grooves 156. The bracket 170 is an elongated plate material disposed along the protector 148 and is bent substantially in a crank form at a transverse direction intermediate portion thereof. Further, a transverse direction one end side of the bracket 170 enters the mounting grooves 156, while the other end side thereof is integrally secured to the inner panel 54 of the door panel 18 by fastening devices such as bolts and rivets, welding or the like.

As illustrated in FIG. 1, a width dimension of an opening of each of the mounting grooves 156 is greater than a plate thickness dimension of the bracket 170, a plurality of retention pieces 162 are formed in an inner wall of the mounting grooves 156, and the bracket 170 is nipped by the elasticity of the retention pieces 162. Further, an interference groove 164 is formed at a bottom portion of the mounting grooves 156, and the transverse direction one end side of the bracket 170 entered the mounting grooves 156 enters the interference groove 164 through the mounting grooves 156. Here, a width dimension of an opening of the interference groove 164 is substantially equal to or smaller than the plate thickness of the bracket 170. Therefore, an inner wall of interference groove 164 abuts the bracket 170, differing from the mounting groove 156.

As described above, the recessed portion 150, the joining portion 160, and the mounting portion 154 are formed such that the recessed portion 150 is positioned at the vehicle transverse direction exterior side of the joining portion 160 and the joining portion 160 is positioned at the vehicle transverse direction interior side of the mounting portion 154. Moreover, the mounting grooves 156 and the interference groove 164 are located substantially at the vehicle transverse direction interior side of the catching hole 158, as illustrated in FIG. 1.

In other words, in the present embodiment, the pressure sensor 120 is substantially provided at the vehicle interior side of the hem 52, offsetting toward the vehicle front side, while the pressure sensor 120 is substantially provided offsetting toward the vehicle exterior side of the bracket 170 which indirectly supports the pressure sensor 120. The protector 148 is thus provided not only with a rigidity against an external force effected substantially from the vehicle front side, but also with a high rigidity against an external force effected substantially from the vehicle transverse direction exterior side with respect to the substantial vehicle front. Therefore, in a case in which external forces acts on the foreign material detector 10 from these directions, the joining portion 160, the mounting portion 154, as well as the bracket 170, reliably support the outer cover portion 124.

<Operations of the present embodiment at the time of catching a foreign material>

Next, upon describing basic operations and effects of the present embodiment at the time of catching a foreign material, a description of specific operations thereof will be given.

In the present embodiment, if the operation switch 98 is operated to close the door panel 18 in a state in which the door panel 18 forming the entrance 58 is opened, the computer 96 operates the sliding door driver 94 comprising the sliding door actuator 24, the sliding door driver 94 allows the sliding door motor 28 to drive, and the door panel 18 is thereby slid toward the front side of the vehicle 14 (i.e., "the closing movement direction" side) through the endless belt 36 and the center arm 50.

If a foreign material exists on a sliding track of the door panel 18 when the door panel 18 slides forward and the entrance (gate) 58 is closed, the closing movement direction side end (front end) of the door panel 18 abuts the foreign material and presses the foreign material. As the protector 148 and the outer cover portion 124 are elastically deformed by a reaction force effected from the foreign material at this time, the wire 128 or the wire 132 provided within the outer cover portion 124 comes into contact and connects to the wire 130 or the wire 134, and the circuit is short-circuited.

As described above, the electric current flowing in the electric circuit which include the wires 128–134 (see FIG. 7) flows without undergoing the resistance 138. Therefore, for example, if the electric current is flowed in this circuit with a constant voltage, the current value changes and the outer cover portion 124 detects the change in the current value at this time. When the outer cover portion 124 detects the change in the current value, the computer 96 operates the sliding door driver 94 and the closer driver 110 and allows the sliding door motor 28 and the closer motor 104 to reversely drive, and the door panel 18 is thereby slid toward the rear side of the vehicle 14. In this way, catching of a foreign material caused by the movement of the door panel 18 can be prevented.

Meanwhile, as described above, in the automatic sliding door device (opening and closing mechanism) 16 of the vehicle 14, up to the point immediately before the door panel (movable body) 18 closes up the entrance (gate) 58, the door panel 18 slides toward the front of the vehicle 14, i.e., in the closing movement direction, along the side wall (closed body) 22. However, from the point immediately before the door panel 18 closes up the entrance 58, the direction of the movement of the door panel 18 is leaned substantially toward the vehicle transverse direction interior side, and the door panel 18 slides in a closing direction shown by arrow A in FIG. 2. In this way, the door panel 18 located at an outer side of the side wall 22 by the time is displaced substantially toward the vehicle interior side, while closing the entrance 58. Further, in a state in which the door panel 18 reaches an end point of its movement where the hem 52 opposes the side wall 22 along the vehicle transverse direction at the vehicle interior side of the side wall 22, an exterior surface of the outer panel 56 substantially becomes coplaner with an exterior surface of the side wall 22.

Here, a pattern of the door panel 18 catching a foreign material in a state in which the door panel 18 is slid in the closing direction which is leaned toward the transverse direction interior side with respect to the substantial vehicle front as described above, will be described, hereinafter.

Figure 3:
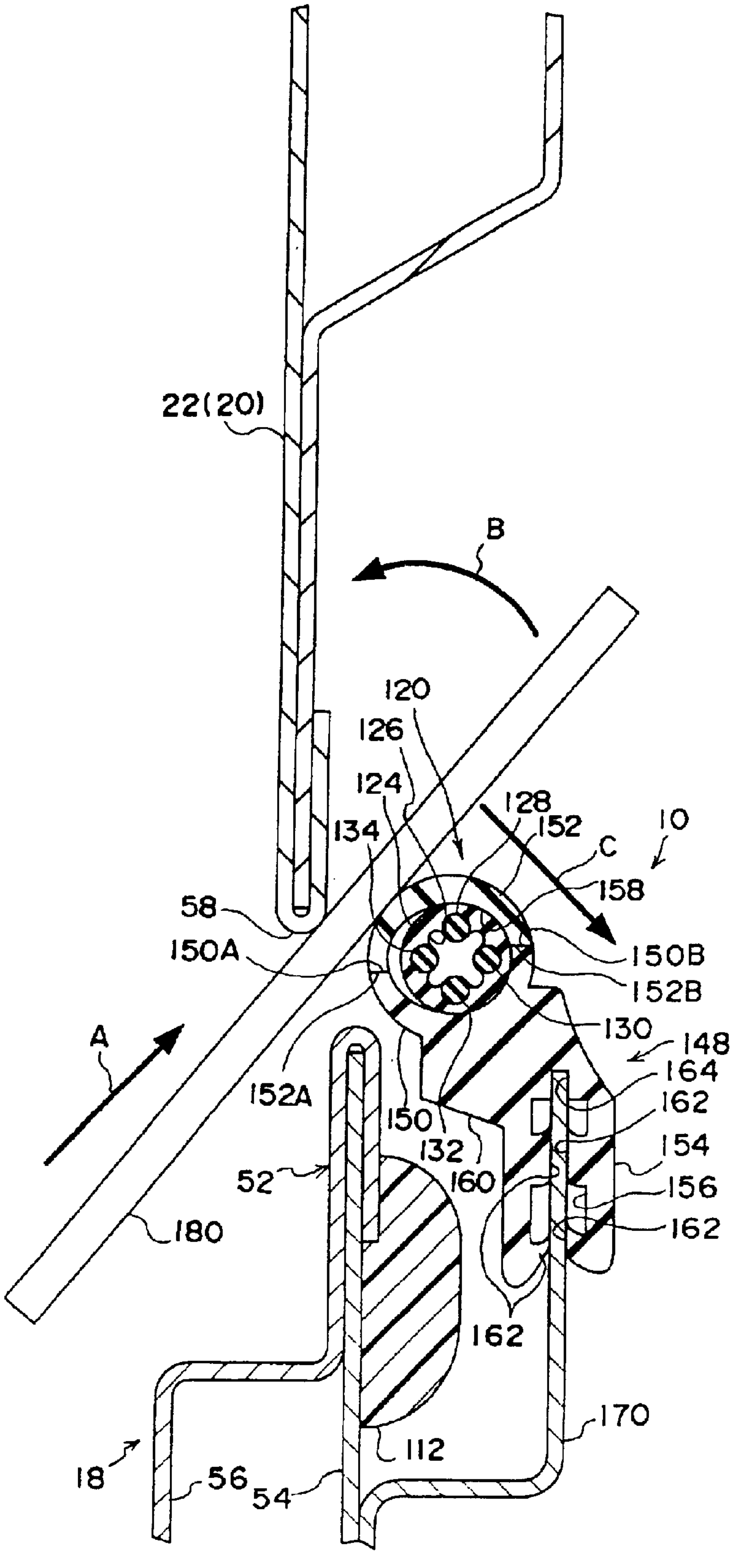
FIG. 3 is an expanded sectional view of a principal part illustrating a state in which a foreign material is caught in a first catching pattern.

In a first catching pattern described in FIG. 3, a foreign material 180 is tilted such that a transverse direction interior side of the foreign material 180 is located substantially at the vehicle front side, compared with a transverse direction exterior side thereof, and a substantial vehicle front side end portion of the foreign material 180 is sufficiently located at the substantial vehicle interior side, compared with the door panel 18. If the foreign material 180 is provisionally caught between the door panel 18 and the side wall 22 in a first catching pattern as described above, the foreign material 180 is drawn substantially toward the vehicle interior side by the door panel 18 sliding in the closing direction (the direction of arrow A in FIG. 3). Further, a pressing force from the door panel 18 attempts to pivotably rotate the substantial vehicle front side of the foreign material 180 toward the vehicle transverse direction exterior side around an inner peripheral portion of the entrance 58. That is, in this pattern, the door panel 18 and the side wall 22 do not press the foreign material 180 simply and substantially in a vehicle longitudinal direction, but the door panel 18 attempts to insert the foreign material 180 between the door panel 18 and the side wall 22 substantially in the vehicle transverse direction, as if it cuts a piece of paper with scissors.

In the pattern above, the pressing force from the door panel 18 attempts to pivotably rotate the substantial vehicle front side of the foreign material 180 toward the vehicle transverse direction exterior side (i.e., in the direction of arrow C in FIG. 3) around the inner peripheral portion of the entrance 58, as described above. Therefore, a pressed reaction force from the foreign material 180 is oriented to a direction leaned toward the vehicle transverse direction interior side with respect to the substantial vehicle rear (in the direction of arrow B in FIG. 3).

In the present embodiment, as described above, the protector 148 has a high rigidity against the external force applied substantially from the vehicle transverse direction external side with respect to the substantial vehicle front, and, in a case in which the external force is applied from the direction, the joining portion 160, the mounting portion 154, and the bracket 170 can reliably support the outer cover portion 124. Accordingly, it is ensured that the outer cover portion 124 can be elastically deformed by the pressed reaction force from the foreign material 180 and the pressed reaction force can be detected.

Further, since a gap S3 is formed between the recessed portion 150 and the hem 52 as described above, the elastic deformation of the flexible portion 152 and the recessed portion 150 due to the reaction force from the foreign material 180 is not prevented by the hem 52, it is thus ensured that the outer cover portion 124 is elastically deformed by the pressed reaction force from the foreign material 180.

As described above, in the present embodiment, the foreign material 180 can be detected by the pressure sensor 120 even in a case of the above-described first catching pattern.

Next, a description of a second catching pattern will be given.

Figure 4:
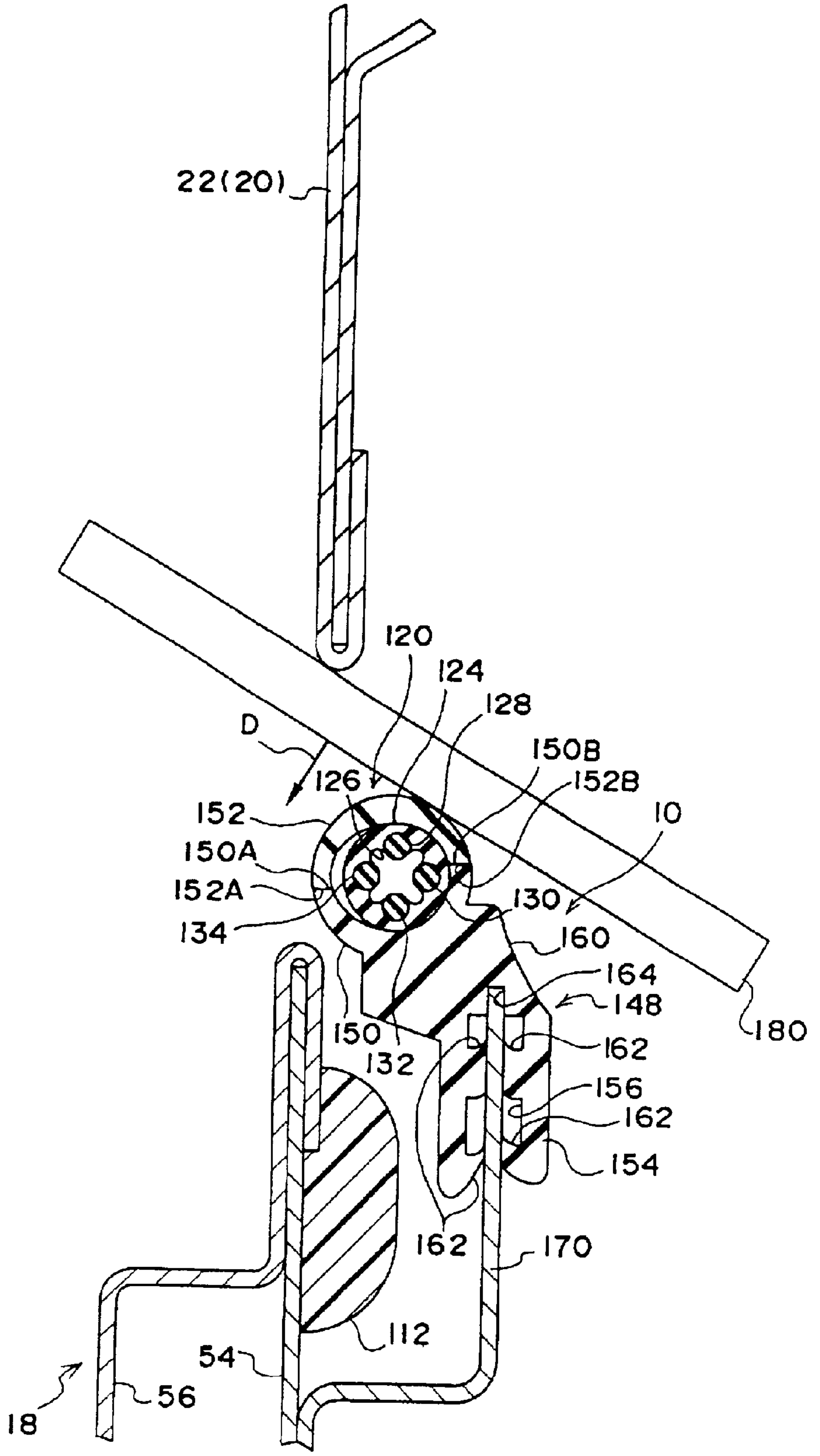
FIG. 4 is an expanded sectional view of a principal part illustrating a state in which a foreign material is caught in a second catching pattern.

Differing from the first pattern described above, the second catching pattern illustrated in FIG. 4 takes a form in which the substantial vehicle transverse direction external side of the foreign material 180 is located substantially at the vehicle front side, compared with the substantial vehicle transverse direction interior side thereof.

In this second catching pattern, an orientation of the pressed reaction force is leaned substantially toward the vehicle rearward and toward the vehicle transverse direction exterior side as illustrated by arrow D in FIG. 4, which is an orientation totally different from that in the first catching pattern. However, in the present embodiment, the pressure sensor 120 is provided so as to be displaced substantially toward the vehicle interior side and the vehicle front side, compared with the hem 52. Because of that, the foreign material 180 does not abut the hem 52 and reliably abuts the flexible portion 152. Therefore, the pressed reaction force from the foreign material 180 acts upon the outer cover portion 124 through the flexible portion 152, and it is ensured that the outer cover portion 124 can be elastically deformed.

As described above, in the present embodiment, the foreign material 180 can be detected by the pressure sensor 120 even in a case of the above-described second catching pattern.

Nest, a description of a third catching pattern will be given.

Figure 5:
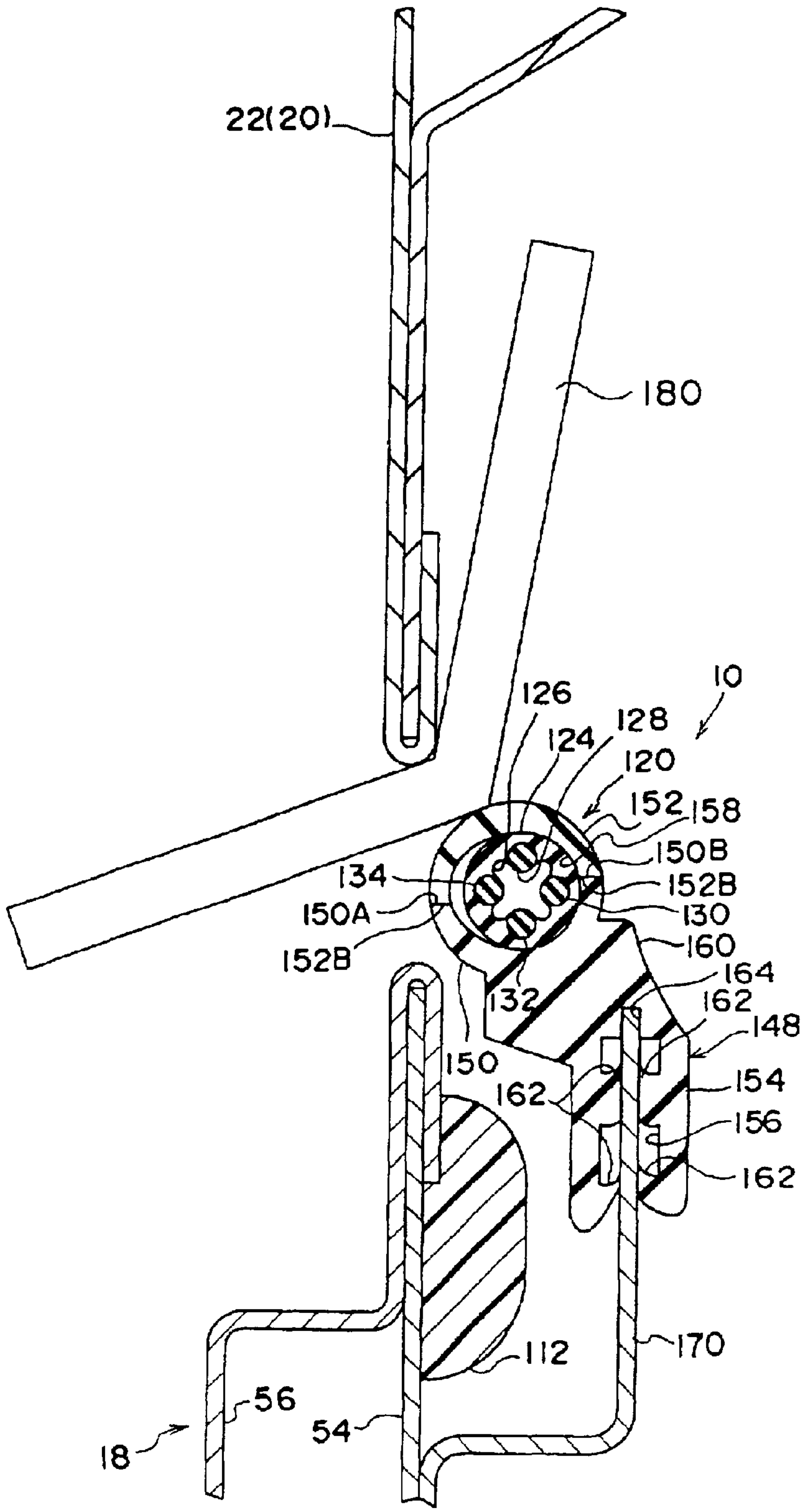
FIG. 5 is an expanded sectional view of a principal part illustrating a state in which a foreign material is caught in a third catching pattern.

Differing from the first pattern described above, the third catching pattern illustrated in FIG. 5 is a case in which the foreign material is deflectable and a substantial vehicle interior side of the foreign material 180 which was pressed to the inner peripheral portion of the entrance 58 (i.e., the side wall 22) is further deflected (bent) by the pressing force applied from the door panel 18 substantially toward the front side of the vehicle from a state of the first catching pattern. When the door panel 18 is further moved in the closing direction from this state of the third catching pattern, the foreign material 180 will be drawn between the side wall 22 and the hem 52 substantially at the vehicle front side of the entrance 58.

In this third catching pattern, as shown in FIG. 5, an orientation of the pressed reaction force effected from the foreign material 180 is leaned substantially toward the vehicle interior side with respect to the substantial vehicle rear. Therefore, since the condition in the third catching pattern basically becomes the same as that in the first catching pattern, the foreign material 180 can be reliably detected as well as the first catching pattern.

<Operations of the present embodiment at the time of assembly or the like>

Next, operations and effects in the present embodiment will be described in terms of assembly.

In the foreign material detector 10 of the present invention, the protector 148, in which the pressure sensor 120 is caught into the catching hole 158, is assembled such that the transverse direction one end side of the bracket 170 which is the other end side of the bracket 170 being assembled to the door panel 18 enters the mounting grooves 156 and the interference groove 164 of the mounting portion 154.

At the time of attaching the protector 148 to the bracket 170, the protector 148 is pressed substantially from the front side of the vehicle until the bracket 170 abuts a bottom portion of the interference groove 164. Here, in a case in which this pressing force is in excess, the one end side of the bracket 170 abutted the bottom portion of the interference groove 164 relatively attempts to escape toward a transverse direction either side of the interference groove 164. Provisionally, in a case in which the bracket 170 is displaced in the interference groove 164 and escaped toward the transverse direction either side of the interference groove 164, a mounting position of the pressure sensor 120 with respect to the bracket 170 is consequently displaced.

However, differing from the mounting grooves 156, an opening width dimension of the interference groove 164 is substantially equal to or smaller than the plate thickness of the bracket 170. Therefore, when the bracket 170 is about to displace within the interference groove 164, the inner wall of the interference groove 164 interferes with the bracket 170 to regulate the displacement of the bracket 170. Accordingly, escaping of the bracket 170 resulted from the above-described pressing force can be prevented or effectively suppressed, and the pressure sensor 120 can be reliably mounted to a preset position.

Incidentally, it is a matter of course that, even though the protector 148 is about to be displaced with respect to the bracket 170 due to the pressed reaction force effected from the foreign material 180, the inner wall of the interference groove 164 interferes with the bracket 170 and regulates the displacement of the bracket 170.

Further, in the respective embodiments described above, the foreign material detector 10 was used for preventing the foreign material 180 from being caught at the door panel 18 in the automatic sliding door device 16 of the vehicle 14. However, the scope of the present invention is not limited to the same.

That is, in a case in which the foreign material detector 10 of the present invention is used for an automatic sliding door device, it is used for automatic sliding door devices employed in any fields, such as a vehicle other than an automobile (e.g., a railway rolling stock), an elevator, and an automatic door and a window of a building or the like.

Further, in the respective embodiments described above, the inner peripheral portion of the entrance 58 (i.e., the side wall 22) which never be moved basically was used as a closed body. However, the closed body may be structured in such a manner that the closed body itself can move. In other words, for example, among the automatic sliding door devices, there is a device structured in such a manner that an entrance or a gate is opened/closed by a pair of door panels sliding in a direction which is reciprocal to each other. The distance between the pair of door panels are ultimately closed by the pair of door panels being respectively moved in a closing direction until an end point of their movement. Therefore, in a case of such a structure, one of the door panels is a movable body, and the other is a closed body.

What is claimed is:

1. A detector for detecting a foreign material caught between a an end portion of a movable body and a closed body, the detector in combination with an opening and closing mechanism and a movable body for movement in a closing movement direction with respect to such closed body, the movable body being for movement toward a closing direction at an angle with respect to the closing movement direction immediately before a closing movement direction end portion of the movable body reaches a closing movement end point located substantially at an orthogonal direction lateral side of such closed body with respect to the closing movement direction, and the movable body thus being for closing a gate located between the movable body and such closed body along the closing movement direction, the foreign material detector comprising:

a pressure sensor, which is mounted on a movable body at a lateral side of the movable body along a substantially orthogonal direction with respect to the closing movement direction, for movement with the movable body, and for detection of a pressed reaction force effected by a foreign material when the pressure sensor presses against such foreign material;

said pressure sensor comprising an exterior periphery and an interior periphery, said exterior and interior peripheries for deforming in a predetermined direction in response to such reaction force and being located closer to said closing movement end point than said end portion of the movable body, wherein said exterior periphery is further away from said closing movement end point than said interior periphery.

2. The foreign material detector according to claim 1, wherein the pressure sensor comprises:

an outer cover portion that is hollow and comprises a synthetic resin material for being elastically deformed by a pressed reaction force;

a plurality of wires located in an inner side of the outer cover portion and for contacting and electrically connecting with each other due to elastic deformation of the outer cover portion; and an accommodating portion having a rigidity greater than a rigidity of the outer cover portion and retaining the outer cover portion at a side opposite to the closing movement direction or the closing direction of the outer cover portion.

3. The foreign material detector according to claim 1, wherein the pressure sensor is offset toward an inner side of the closing movement direction of the movable body end portion and toward the closing movement end point.

4. The foreign material detector according to claim 2, wherein the pressure sensor is mounted to the movable body so that a gap is formed between the pressure sensor and the closing movement direction side end portion of the movable body.

5. The foreign material detector according to claim 2, wherein the accommodating portion comprises a recessed portion that covers a part of the outer cover portion, the recessed portion comprises a first end portion and a second end portion, and the first end portion is located at a forward position along the closing movement direction, relative to the second end portion.

6. The foreign material detector according to claim 3, wherein the movable body and the closed body are a pair of door panels.

7. The foreign material detector according to claim 3, wherein the movable body is a sliding door and the closed body is a wall.

8. The foreign material detector according to claim 4, comprising:

a supporting device integrally mounted to the movable body at a side opposite to the closing movement direction of the pressure sensor; and a retainer comprising a groove portion for receiving the supporting device from the side opposite to the closing movement direction, and further comprising a nipping portion for nipping an end portion of the supporting device from both sides thereof when the supporting device has entered into the groove portion, while retaining the pressure sensor.

9. The foreign material detector according to claim 5, further comprising a flexible portion joined to the recessed portion of the accommodating portion to accommodate the outer cover portion, wherein an inner side of a structure in which the flexible portion is joined to the recessed portion has a catching hole, and a gap exists between an inner peripheral portion of the catching hole and an outer peripheral portion of the outer cover portion.

10. The foreign material detector according to claim 8, wherein the pressure sensor is offset toward an outer side of the movable body with respect to the supporting device.

11. A foreign material detector in combination with a sliding door device and a door panel for opening and closing in a vehicle longitudinal direction, the door panel for moving toward a closing direction that is at an angle with respect to the vehicle longitudinal direction immediately before a closing movement direction side end portion of the door panel reaches a closing movement end point located at a lateral side of a vehicle side wall along a substantially orthogonal direction with respect to a closing movement direction, thereby closing a gate located in such vehicle side wall, comprising:

a pressure sensor mounted on the door panel and moveable together with the door panel, said pressure sensor located at a position offset toward a closing movement side of an end portion of the door panel and toward a vehicle right and left direction lateral side, along a vertical direction of the door panel, and for detecting a foreign material located between the end portion of the door panel and such vehicle side wall;

said pressure sensor comprising an exterior periphery and an interior periphery, said exterior and interior peripheries for deforming in a predetermined direction in response to a pressed reaction force effected by a foreign material when the pressure sensor presses against such foreign material, and being located closer to said closing movement end point than said end portion of the door panel, wherein said exterior periphery is further away from said closing movement end point than said interior periphery.

12. The foreign material detector for a sliding door according to claim 11, wherein the closing movement direction of the door panel is angled toward a vehicle transverse direction interior side with respect to the vehicle longitudinal direction, while the pressure sensor is offset toward the vehicle interior side of the end portion of the door panel.

13. The foreign material detector according to claim 11, wherein the pressure sensor comprises:

an outer cover portion that is hollow and comprises a synthetic resin material that is elastically deformable due to the pressed reaction force;

a plurality of wires located in an inner side of the outer cover portion for contacting and electrically connecting with each other due to elastic deformation of the outer cover portion; and an accommodating portion having a rigidity greater than the outer cover portion and retaining the outer cover portion at a side opposite to the closing movement direction or the closing direction of the outer cover portion.

14. The foreign material detector for a sliding door according to claim 12, wherein the accommodating portion comprises a recessed portion that covers a part of the outer cover portion, the recessed portion comprises a first end portion and a second end portion, and the first end portion is located at a forward position along the closing movement direction, compared with the second end portion.

15. The foreign material detector for a sliding door according to claim 13, wherein the pressure sensor is mounted to the door panel so that a gap is formed between the pressure sensor and the end portion of the door panel.

16. The foreign material detector for a sliding door according to claim 13, further comprising:

a supporting device integrally mounted to the door panel at a side opposite to the closing movement direction of the pressure sensor; and a retainer comprising a groove portion for receiving the supporting device from a side opposite to the closing movement direction and a nipping portion for nipping the end portion of the supporting device that has entered the groove portion, and for retaining the pressure sensor.

17. The foreign material detector for a sliding door according to claim 14, further comprises a flexible portion joined to the recessed portion of the accommodating portion and accommodating the outer cover portion, an inner side of a structure in which the flexible portion is joined to the recessed portion, the structure having a catching hole, wherein a gap exists between an inner peripheral portion of the catching hole and an outer peripheral portion of the outer cover portion.

18. The foreign material detector for a sliding door according to claim 16, wherein the pressure sensor is offset toward an outer side of the door panel with respect to the supporting device.

19. A method for detecting a foreign material caught between an end portion of a sliding door panel and a vehicle body, wherein such door panel is for opening and closing in a vehicle longitudinal direction, and for movement toward a closing direction at an angle with respect to such vehicle longitudinal direction immediately before a closing movement direction side end portion of such door panel reaches a closing movement end point located at a lateral side of a vehicle side wall along a substantially orthogonal direction with respect to a closing movement direction, thereby closing a gate located in such vehicle side wall, the method comprising:

detecting a foreign material that intersects the closing movement direction of such door panel and impedes closing of such door panel by a pressure sensor mounted on such door panel and movable together with such door panel, and extending from a closing movement direction side of an end portion of such door panel and mounted to an outside of such door panel, wherein said pressure sensor comprises an exterior periphery and an interior periphery, said exterior and interior peripheries for deforming in a predetermined direction in response to a pressed reaction force effected by a foreign material when the pressure sensor presses against such foreign material, and being located closer to said closing movement end point than said end portion of such door panel, wherein said exterior periphery is further away from said closing movement end point than said interior periphery.

20. The method for detecting a foreign material caught in a sliding door device according to claim 19, further comprising detecting a change in a current value when a foreign material exerts a reaction force on, and thereby deforms an outer cover portion of the pressure sensor, and when a plurality of wires located within the outer cover portion contact and electrically connect with each other.

21. A foreign material detector for attachment to a door of a vehicle and for detecting a foreign material caught between a door end portion and such door, wherein a door panel of such door is slidable with a closing movement in a longitudinal direction of such vehicle, the closing movement ending at a terminus on a side of such vehicle, such door panel comprising a side periphery and being movable in an oblique closing direction to the longitudinal direction before the side periphery reaches the terminus to close a gate located at the side of such vehicle, the foreign material detector comprising:

a pressure sensor mounted on a portion of such door panel for movement with such door panel, such portion located closer to the terminus than the side periphery of such door panel and positioned farther away from a center of a transverse direction of such vehicle than the side periphery of such door panel, the pressure sensor for detecting a reaction force effected by a foreign material when the pressure sensor comes into contact with the foreign material located between the side periphery of such door panel and the side of such vehicle, the pressure sensor comprising an outer cover and an accommodating portion, the outer cover being elastically deformable by the reaction force, the accommodating portion having a greater rigidity than the outer cover, the accommodating portion for holding a portion of the outer cover positioned farthest with respect to either the terminus or the oblique closing direction of such door panel, the accommodating position comprising a groove and a flexible portion, the groove being opened toward the closing direction of such door panel, the flexible portion having a smaller rigidity than the groove opens toward an opening direction of such door panel and is located opposite to the groove, wherein the groove includes a first periphery closer to an exterior of such vehicle and a second periphery closer to an interior of such vehicle, and the first periphery is located closer to the terminus than the side periphery of such door panel and the first periphery is located closer to a fully-opened position of such door panel than the second periphery;

said pressure sensor comprising an exterior periphery and an interior periphery, said exterior and interior peripheries for deforming in a predetermined direction in response to a pressed reaction force effected by a foreign material when the pressure sensor presses against such foreign material, and being located closer to said terminus than such door end portion of such door panel, wherein said exterior periphery is further away from the terminus than said interior periphery.

22. The foreign material detector of claim 21, wherein the closing movement of such door panel is angled toward an interior of such vehicle with respect to such vehicle longitudinal direction, and the pressure sensor is positioned closer to the interior of such vehicle than the side periphery of such door panel.

23. The foreign material detector of claim 21, wherein the pressure sensor is mounted on such door panel and forms a space between the pressure sensor and the side periphery of such door panel.

24. The foreign material detector of claim 21, further comprising a supporting device for supporting the pressure sensor and a retainer for retaining the pressure sensor, the supporting device being integrally mounted on such door panel at a side opposite to the closing movement of the pressure sensor, the retainer including a groove portion for receiving the supporting device from the side opposite to the closing movement and a nipping portion for nipping two portions of the side periphery of the supporting device entered the groove portion.

25. The foreign material detector of claim 21, further comprising a supporting device for supporting the pressure sensor, the supporting device being integrally mounted on such door panel at a side opposite to the closing movement direction of the pressure sensor, wherein the pressure sensor is offset inward along the transverse direction of such vehicle and forward along the longitudinal direction of such vehicle with respect to the side periphery of such door panel, and offset outward along the transverse direction of such vehicle with respect to the supporting device.

* * * * *